(12) United States Patent
Tohara et al.

(10) Patent No.: US 7,864,459 B2
(45) Date of Patent: Jan. 4, 2011

(54) IMAGE DISPLAY APPARATUS

(75) Inventors: Masakazu Tohara, Kawasaki (JP);
Shoichi Yamazaki, Yokohama (JP);
Kazutaka Inoguchi, Kawasaki (JP);
Kenichi Saito, Yokohama (JP); Motomi Tsuyuki, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/782,353

(22) Filed: May 18, 2010

(65) Prior Publication Data

US 2010/0290124 A1    Nov. 18, 2010

(30) Foreign Application Priority Data

May 18, 2009    (JP)    .............................. 2009-119593

(51) Int. Cl.
*G02B 7/02*    (2006.01)

(52) U.S. Cl. ....................... 359/819; 359/811

(58) Field of Classification Search ......... 359/629–633, 359/811, 813, 819, 822
See application file for complete search history.

(56) References Cited

U.S. PATENT DOCUMENTS

| 5,751,494 A | 5/1998 | Takahashi |
| 6,008,778 A | 12/1999 | Takahashi et al. |

FOREIGN PATENT DOCUMENTS

| JP | 7-274097 A | 10/1995 |
| JP | 9-166759 A | 6/1997 |
| JP | 10-246865 A | 9/1998 |
| JP | 11-326820 A | 11/1999 |
| JP | 3524569 B2 | 5/2004 |

OTHER PUBLICATIONS

Tohara, Masakazu, "Observation Optical System and Image Display Apparatus," Specification and Drawings of unpublished related co-pending U.S. Appl. No. 12/782,373, pp. 1-46.

*Primary Examiner*—Joseph Martinez
*Assistant Examiner*—Brandi N Thomas
(74) *Attorney, Agent, or Firm*—Rossi, Kimms & McDowell LLP

(57) ABSTRACT

The image display apparatus includes first and second display elements respectively displaying first and second original images, and an optical system presenting an enlarged combined image of the first and second original images with first and second light fluxes from the first and second display elements. The optical system includes at least one reflective surface. When a cross-section of the optical system on which optical paths of the first and second light fluxes are turned by reflections at the reflective surface is defined as a decentering cross-section, the first and second original images correspond to different view angles in the decentering cross-section. Light flux components respectively included in the first and second light fluxes and introduced to a same image point in the enlarged combined image are overlapped with each other on an exit pupil plane.

4 Claims, 12 Drawing Sheets

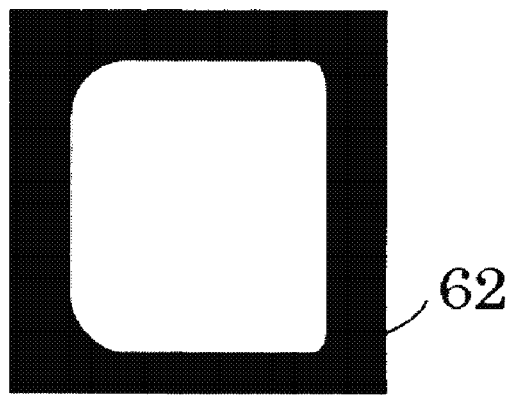
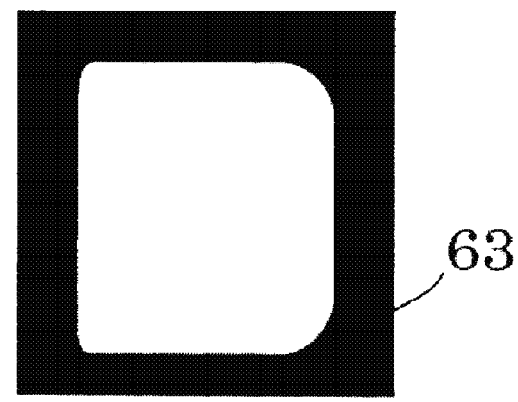
FIG. 5A  FIG. 5B
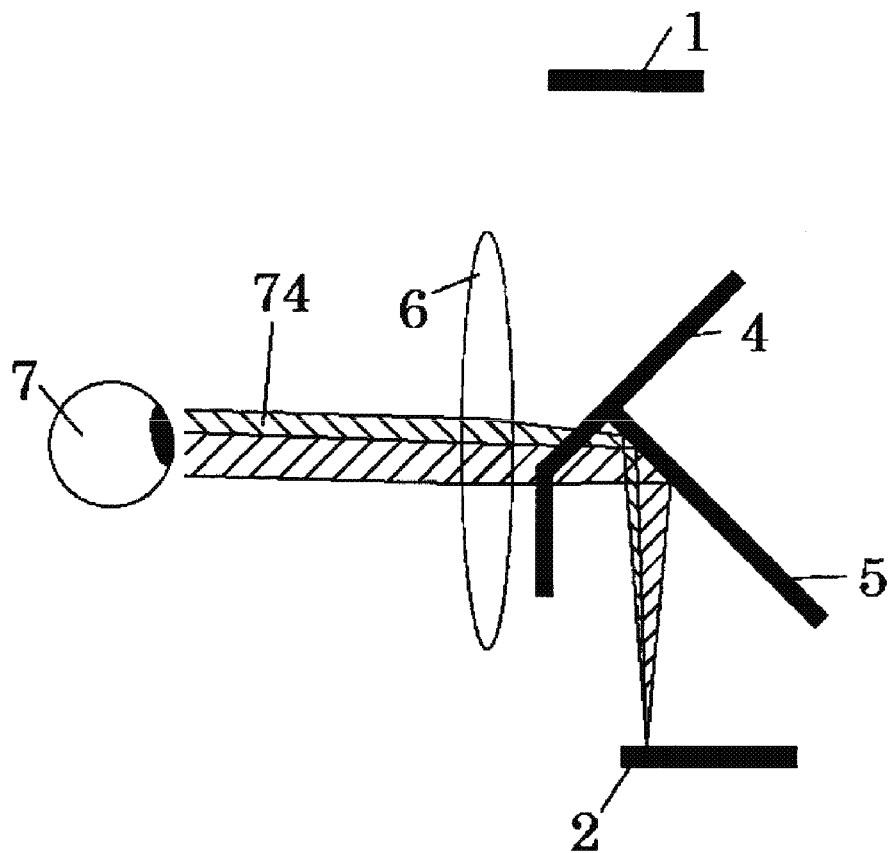
FIG. 6

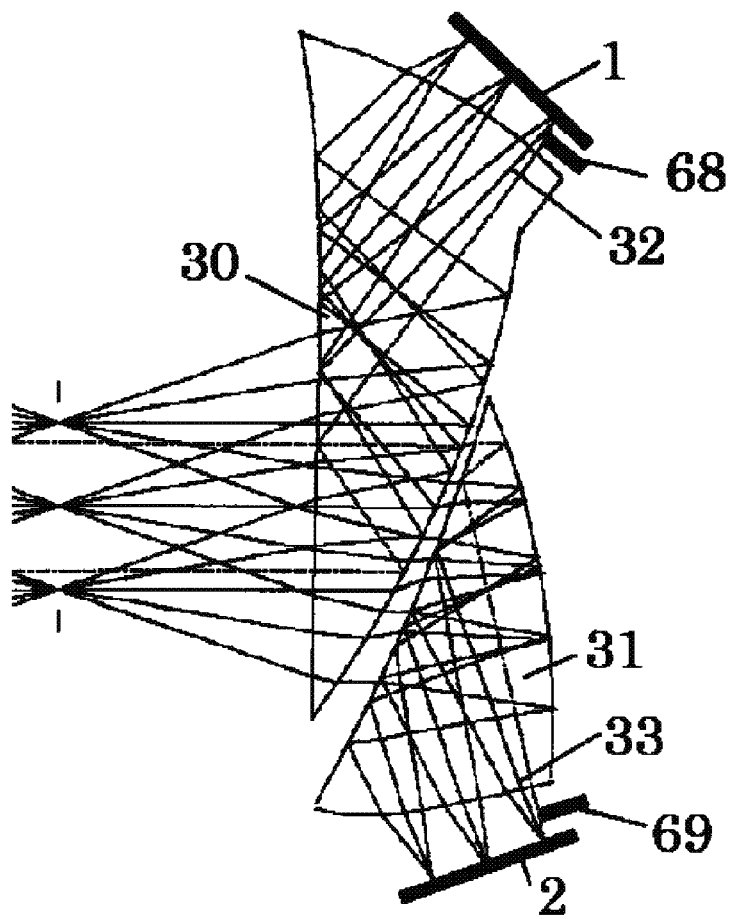
FIG. 13
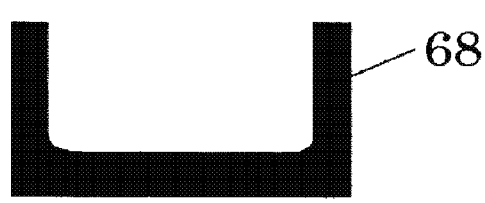
FIG. 14A                    FIG. 14B

IMAGE DISPLAY APPARATUS

BACKGROUND OF THE INVENTION

1. Field of the Invention

The present invention relates to an image display apparatus that combines light fluxes from plural display elements to present one enlarged combined image, in particular, relates to an image display apparatus suitable for a head-mounted display (HMD).

2. Description of the Related Art

For observation optical systems used for image display apparatuses such as HMDs, image presentation with a wide view angle is required to enable natural observation of images and to increase realistic sensation. Moreover, it is desirable that such image display apparatuses being mounted on an observer's head be small and thin.

Some of such small and thin image display apparatuses capable of presenting images with a wide view angle use plural display elements displaying original images for mutually different view angles, and form one image by combining plural enlarged images corresponding to the original images to enable observation of an enlarged combined image. The use of the plural display elements enables reduction in size and thickness of an optical system for each of the plural display elements, which realizes a wholly small and thin image display apparatus capable of presenting images with a wide view angle.

Such image display apparatuses have been disclosed in Japanese Patent Laid-Open Nos. 07-274097, 11-326820, 10-246865 and 09-166759 and Japanese Patent No. 3524569.

The image display apparatuses disclosed in Japanese Patent Laid-Open Nos. 07-274097, 11-326820 and 10-246865 and Japanese Patent No. 3524569 use an optical system incapable of overlapping light fluxes reaching a boundary part of images mutually combined. Therefore, when an observer's eye is rotated to generate a gap between an exit pupil of the optical system and an observer's pupil (in other words, between a visual axis of the image display apparatus and the observer's eye), a light flux from part of the combined image is not introduced to the observer's pupil, and thereby image lacking is observed by the observer.

FIG. 22A shows a state where an observer's eye 7 is rotated in a conventional image display apparatus whose optical system is constituted by a V-shaped mirror 203 and an ocular lens 204. When the observer's eye 7 is rotated upward, a light flux from a display element 202 forming a lower side shallow view angle is introduced to the eye (pupil) 7, but a light flux from a display element 201 is not introduced thereto. Therefore, only the light flux forming the lower side shallow view angle is introduced to the eye (pupil) 7.

To solve such a problem, as shown in FIG. 22B, Japanese Patent No. 3524569 has disclosed a method of enlarging a display area of each of display elements 205 and 206 in a divisional direction of a combined image and providing to original images displayed on the display elements 205 and 206 overlapping areas where a same original image is displayed. Such provision of the overlapping areas causes the light flux that is not introduced to the eye (pupil) in the image display apparatus shown in FIG. 22A is introduced thereto from the display element 205.

However, it is necessary for introducing light flux from all the original images to the eye (pupil) to enlarge the overlapping area. For example, in a case where a horizontal view angle is 50 degrees, a vertical view angle is 40 degrees, a diameter of an exit pupil of the optical system is 12 mm, an eye relief (distance from the exit pupil to the optical system) is 20 mm and the horizontal view angle is divided into plural view angles by the method disclosed in Japanese Patent No. 3524569, it is necessary for introducing the light fluxes from all the original images to the eye (pupil) to cause each display element to display an original image corresponding to a view angle of 38.5 degrees that is a sum of half (25 degrees) of the horizontal view angle (50 degrees) and a view angle of the overlapping area (13.5 degrees).

In other words, the view angle of the overlapping area is 27 degrees with respect to the entire horizontal view angle of 50 degrees, which is a larger view angle than half of the entire horizontal view angle. Such a large overlapping area makes image information presentation efficiency of each display element low, which makes it difficult to achieve an image display apparatus capable of presenting images with a wide view angle.

Moreover, the apparatus disclosed in Japanese Patent Laid-Open No. 9-166759 uses in a first ocular optical system a concave mirror formed as a half-mirror to prevent a phenomenon of image darkening or image lacking occurring near a center of a displayed image due to a joint line (ridge line) of two mirrors disclosed in Japanese Patent Laid-Open No. 7-274097 and Japanese Patent No. 3524569.

However, the apparatus disclosed in Japanese Patent Laid-Open No. 9-166759 prevents such image lacking occurring at a joint line of an enlarged image when the visual axis of the observer does not match the visual axis of the apparatus by providing overlapping areas in two original images where a same partial image is displayed. Thus, Japanese Patent Laid-Open No. 9-166759 has not mentioned a case where there is no overlapping area in the two original images.

Moreover, the apparatus disclosed in Japanese Patent Laid-Open No. 9-166759, all of light from a prism disposed far from an observer passes through a prism disposed near the observer. Therefore, a size of the prism disposed near the observer is increased, and thereby a size of the entire optical system is increased, which is not suitable for a small and thin HMD.

Specifically, the size of the optical system in the apparatus disclosed in Japanese Patent Laid-Open No. 9-166759 is increased in the following two directions. In a horizontal direction, all of the light that has emerged from one of the display elements and then has passed through the prism disposed far from the observer passes through the prism disposed near the observer. Therefore, the horizontal size of the prism disposed near the observer is increased for an effective light flux from the other display element. Moreover, since the light is introduced in a vertical direction as well as in the horizontal direction, the prism disposed far from the observer and the prism disposed near the observer are arranged so as to nearly entirely overlap with each other in the vertical direction, which makes the vertical size (thickness) of the optical system larger.

SUMMARY OF THE INVENTION

The present invention provides a small and thin image display apparatus presenting with a wide view angle an enlarged combined image formed by combining light fluxes from plural display elements, and capable of suppressing generation of image lacking occurring due to rotation of an observer's eye.

The present invention provides as an aspect thereof an image display apparatus including a first display element configured to display a first original image, a second display element configured to display a second original image, and an optical system configured to present to an observer an enlarged combined image of the first and second original images with a first light flux from the first display element and a second light flux from the second display element. The optical system includes at least one reflective surface. When a cross-section of the optical system on which optical paths of the first light flux and the second light flux are turned by reflections at the reflective surface is defined as a decentering cross-section, the first original image and the second original image correspond to different view angles from each other in the decentering cross-section. Light flux components which are respectively included in the first light flux and the second light flux and introduced to a same image point in the enlarged combined image are overlapped with each other on an exit pupil plane of the optical system.

Other aspects of the present invention will become apparent from the following description and the attached drawings.

BRIEF DESCRIPTION OF THE DRAWINGS

FIGS. 5A and 5B are figures for explaining shapes of the aperture stops in Embodiment 2.

FIG. 6 is a figure for explaining solution of a conventional problem in Embodiment 2.

FIG. 13 is a figure for explaining a configuration in which stoppers are provided in Embodiment 4.

FIGS. 14A and 14B are figures for explaining shapes of the stoppers in Embodiment 4.

DESCRIPTION OF THE PREFERRED EMBODIMENTS

Exemplary embodiments of the present invention will hereinafter be described with reference to the accompanying drawings.

Embodiment 1

Figure 1:
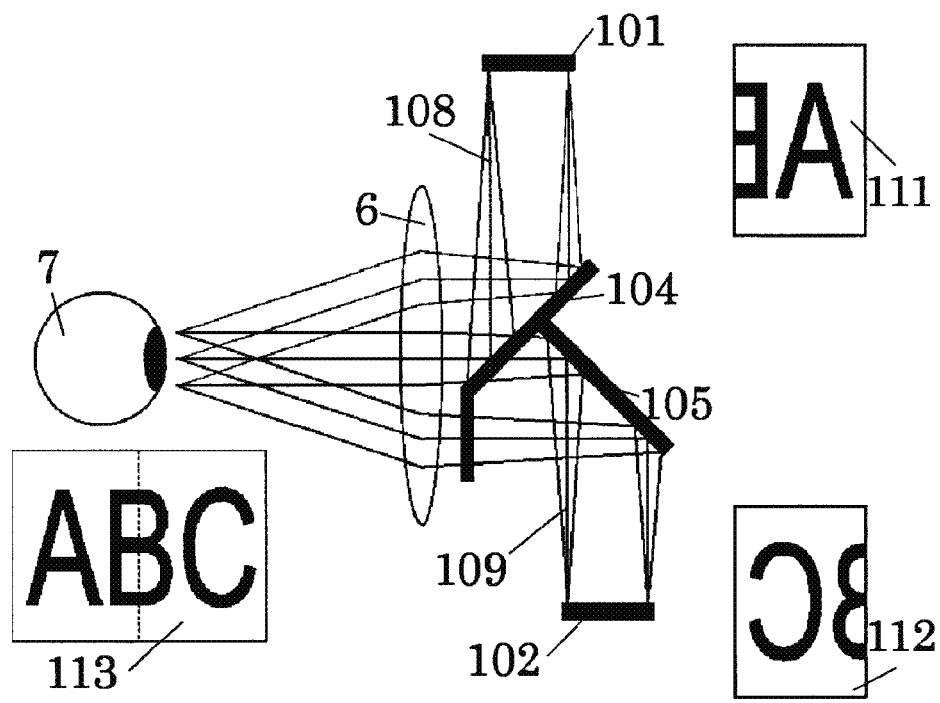
FIG. 1 is a diagrammatic illustration showing an HMD that is Embodiment 1 of the present invention.

FIG. 1 shows an HMD (image display apparatus) that is a first embodiment (Embodiment 1) of the present invention. The HMD of this embodiment introduces light fluxes from two display elements provided for two view angles divided in a horizontal direction that is a direction of a decentering cross-section of an optical system to an exit pupil of the optical system. The decentering cross-section of the optical system will be explained later.

In FIG. 1, reference numeral 101 denotes a first display element, and reference numeral 102 denotes a second display element. As the first and second display elements 101 and 102, a light-emitting display element such as an organic EL (electroluminescence) element or an LCD constituted by a transmissive liquid crystal panel and a backlight unit can be used. The same is applied to other embodiments which will be described later.

Reference numeral 104 denotes a first optical element, and reference numeral 105 denotes a second optical element. In this embodiment, a half-mirror is used as the first optical element 104, and a mirror is used as the second optical element 105. Reference numeral 6 denotes an ocular lens. The first and second optical elements 104 and 105 and the ocular lens 6 constitute the optical system. Reference numeral 7 denotes an observer's eye which is placed at a position of the exit pupil of the optical system or in the vicinity thereof.

The "decentering cross-section" is a cross-section on which optical paths of the light fluxes from the first and second display elements 101 and 102 (that is, of central view angle principal rays emerging from centers of the respective display elements [original images] 101 and 102 and then reaching a center of the exit pupil of the optical system) are turned (folded) by reflections at the first and second optical elements 104 and 105. The cross-section shown in FIG. 1 corresponds to the "decentering cross-section". The "direction of the decentering cross-section" (hereinafter referred to as "decentering cross-sectional direction") is a direction including the "decentering cross-section" or a direction parallel to the "decentering cross-section".

Although this embodiment and subsequent embodiments will describe about an HMD, alternative embodiments of the present invention include other image display apparatuses than the HMD, each apparatus presenting an image to an observer's eye placed at the position of the exit pupil of the optical system or in the vicinity thereof. Hereinafter, a plane including the exit pupil of the optical system is referred to as "exit pupil plane".

A light flux (first light flux) 108 that has emerged from an image (first original image) 111 displayed on the first display element 101 is reflected by the first optical element 104 and then introduced to the eye 7 through the ocular lens 6 as a light flux forming a left view angle shown in an upper part of the figure. A light flux (second light flux) 109 that has emerged from an image (second original image) 112 displayed on the second display element 102 is reflected by the second optical element 105, transmitted through the first optical element 104 and then introduced to the eye 7 through the ocular lens 6 as a light flux forming a right view angle shown in a lower part of the figure. The left view angle and the right view angle are different view angles from each other.

The optical system presents to the eye 7 (that is, to the observer) an enlarged combined image 113 of the first and second original images 111 and 112 with the first and second light fluxes 108 and 109.

Of the first and second light fluxes 108 and 109 that have respectively emerged from the first and second display elements 101 and 102, partial light fluxes (light flux components) that are introduced to a same image point in the enlarged combined image 113 (that is, light fluxes forming images of a same point) are entirely overlapped with each other on the exit pupil plane.

In this embodiment, an area of the exit pupil plane where the first light flux 108 and the second light flux 109 are overlapped with each other corresponds to a 100-percent area of the exit pupil. In other words, the first and second light fluxes 108 and 109 are overlapped with each other in the exit pupil at an overlapping ratio of 100%. In such a state, light fluxes forming an entire view angle are introduced to a pupil of the eye 7.

Therefore, it is unnecessary to provide overlapping areas where a same partial image (same original image part) is displayed to the first and second original images 111 and 112 respectively displayed on the first and second display elements 101 and 102. In other words, in a case where the enlarged combined image 113 being observed is formed such that edges of the first and second original images 111 and 112 are jointed to each other, it is unnecessary to provide the overlapping areas to the first and second original images 111 and 112 as shown in the figure.

Providing no overlapping area in the first and second original images 111 and 112, that is, displaying no same original image part in the first and second original images 111 and 112 makes it possible to efficiently use a display area of each display element, which increases image information presentation efficiency of each display element.

In general, a display element has a structure in which plural pixels are arranged like a matrix, and even when no overlapping areas is provided in two original images displayed on two display elements, a light flux exists which emerges from between the pixels of the display element to be introduced to a same image point in an enlarged combined image.

Therefore, the "same image point" in the expression "light flux components which are respectively included in the first light flux and the second light flux and introduced to a same image point in the enlarged combined image are overlapped with each other on an exit pupil plane of the optical system" includes, when the two original images are provided with no overlapping areas, a point between pixels of the enlarged combined image. The same is applied to the subsequent embodiments.

In this embodiment, the first optical element 104 is constituted by a half-mirror which reflects light with a same intensity as that of light being transmitted therethrough in order to introduce the first and second light fluxes 108 and 109 from the two display elements 101 and 102 with an approximately same luminance to the eye 7. However, the area of the exit pupil plane where the first and second light fluxes 108 and 109 are overlapped with each other has a luminance twice as high as those of other areas, and therefore it is desirable to provide a light amount reducing element such as a neutral density (ND) filter on an optical path on which the first and second light fluxes 108 and 109 pass. Alternatively, a luminance of the overlapping areas of the two original images corresponding to the area on the exit pupil plane where the first and second light fluxes 108 and 109 are overlapped with each other may be reduced. The same is applied to the subsequent embodiments.

Although this embodiment described the case where the view angle is divided into two in the horizontal direction, a similar configuration to that of this embodiment can be employed when the view angle is divided into two in the vertical direction.

Embodiment 2

Figure 2:
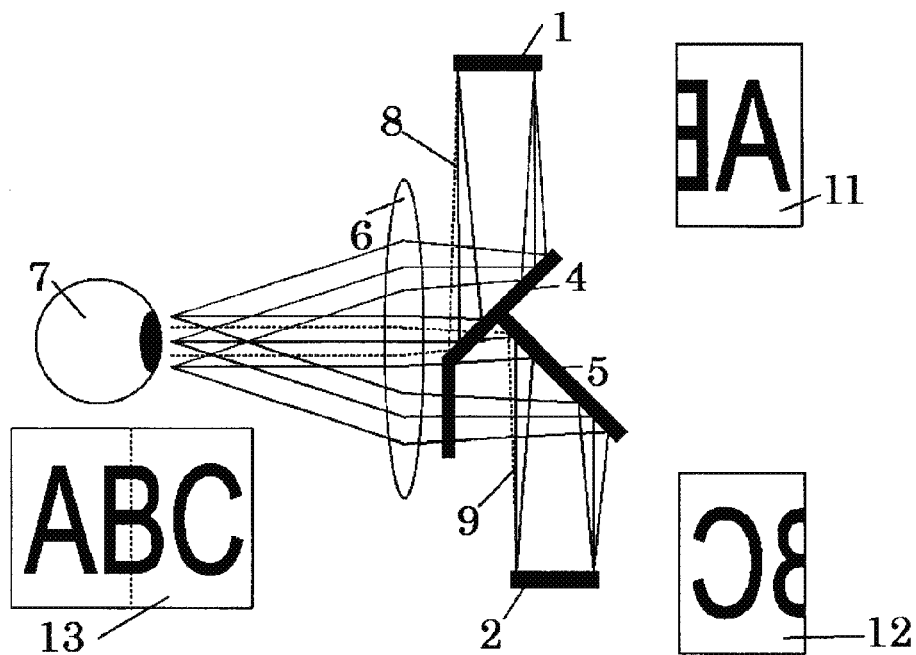
FIG. 2 is a diagrammatic illustration showing an HMD that is Embodiment 2 of the present invention.

FIG. 2 shows an HMD (image display apparatus) that is a second embodiment (Embodiment 2) of the present invention. The HMD of this embodiment introduces light fluxes from two display elements provided for two view angles divided in a horizontal direction that is a decentering cross-sectional direction of an optical system to an exit pupil of the optical system.

In FIG. 2, reference numeral 1 denotes a first display element, and reference numeral 2 denotes a second display element. Reference numeral 4 denotes a first optical element, and reference numeral 5 denotes a second optical element. In this embodiment, a half-mirror is used as the first optical element 4, and a mirror is used as the second optical element 5. Reference numeral 6 denotes an ocular lens. The first and second optical elements 4 and 5 and the ocular lens 6 constitute the optical system. Reference numeral 7 denotes an observer's eye which is placed at a position of the exit pupil of the optical system or in the vicinity thereof. A cross-section shown in FIG. 2 corresponds to the decentering cross-section.

A light flux (first light flux) 8 that has emerged from an image (first original image) 11 displayed on the first display element 1 is reflected by the first optical element 4 and then introduced to the eye 7 through the ocular lens 6 as a light flux forming a left view angle shown in an upper part of the figure. A light flux (second light flux) 9 that has emerged from an image (second original image) 12 displayed on the second display element 2 is reflected by the second optical element 5, transmitted through the first optical element 4 and then introduced to the eye 7 through the ocular lens 6 as a light flux forming a right view angle shown in a lower part of the figure. The left view angle and the right view angle are different view angles from each other.

The optical system presents to the eye 7 an enlarged combined image 13 of the first and second original images 11 and 12 with the first and second light fluxes 8 and 9.

Figure 3:
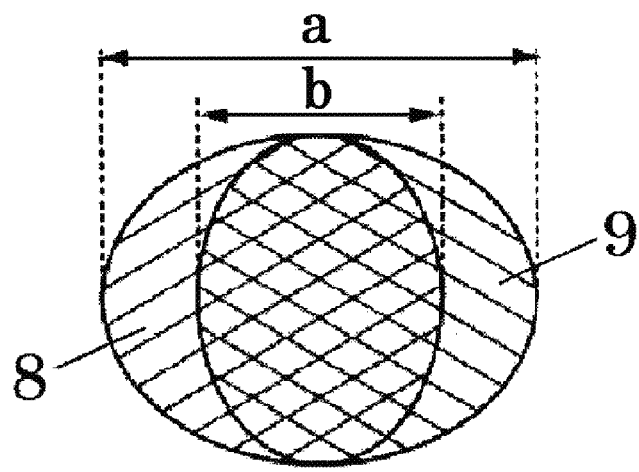
FIG. 3 is a figure for explaining overlapping of light fluxes on an exit pupil plane in Embodiment 2.

Of the first and second light fluxes 8 and 9 that have respectively emerged from the first and second display elements 1 and 2, partial light fluxes (light flux components) being introduced to a same image point in the enlarged combined image 13 are overlapped with each other on the exit pupil plane as shown in FIG. 3.

Reference character a in FIG. 3 denotes a horizontal width of the exit pupil in the decentering cross-section of the optical system, and reference character b denotes a horizontal width of an area where the first and second light fluxes 8 and 9 are overlapped with each other on the exit pupil plane in the decentering cross-section. On the exit pupil plane, as shown in FIG. 3, the first light flux 8 forms a left area of the exit pupil and the second light flux 9 forms a right area of the exit pupil. In addition, the first light flux 8 and the second light flux 9 are overlapped with each other in a central area of the exit pupil.

Description will hereinafter be made of a case where the optical system divides a horizontal view angle of 35 degrees into two view angles and a diameter of the exit pupil is 10 mm. In this optical system, when a radius of rotation of the eye 7 is 12 mm, a center of a pupil of the eye 7 observing a direction of a left maximum view angle of 17.5 degrees is moved to the left by 3.6 mm with respect to the center of the pupil of the eye 7 observing a direction of a view angle of 0 degree.

In this state, if the second light flux 9 is introduced to the center of the pupil of the eye 7, all light rays forming an entire view angle corresponding to the second display element 2 enter at least a half area of the pupil of the eye 7. Thereby, an optical system can be achieved from which light fluxes (light rays) forming an entire view angle constituted by the view angles corresponding to the first and second display elements 1 and 2 are introduced to the pupil of the eye 7.

Thus, it is only necessary that a horizontal width of the second light flux 9 be 3.6 mm on a left side and 5 mm on a right side with respect to the exit pupil diameter of 10 mm. Similarly, it is only necessary that a horizontal width of the first light flux 8 be 5 mm on the left side and 3.6 mm on the right side with respect to the exit pupil diameter of 10 mm.

In this embodiment, the area where the first light flux 8 and the second light flux 9 are overlapped with each other on the exit pupil plane is a 72-percent (b/a=0.72) area of the exit pupil. In other words, the first light flux 8 and the second light flux 9 are overlapped with each other at an overlapping ratio of 72% of the exit pupil. In such a state, the light fluxes forming the entire view angle are introduced to the pupil of the eye 7.

Therefore, it is unnecessary to provide overlapping areas in the first and second original images 11 and 12 respectively displayed on the first and second display elements 1 and 2. In other words, in a case where the enlarged combined image 13 being observed is formed such that edges of the first and second original images 11 and 12 are jointed to each other as shown in FIG. 2, it is unnecessary to provide the overlapping areas in the first and second original images 11 and 12 as shown in the figure.

Providing no overlapping area in the first and second original images 11 and 12 makes it possible to efficiently use a display area of each display element, which increases image information presentation efficiency of each display element. Further, although the overlapping of the light fluxes at the same image point is necessary for observation of a continuous (seamless) enlarged combined image when the eye 7 is rotated, the reduced overlapping ratio described above makes it possible to decrease a thickness of the optical system.

Figure 4:
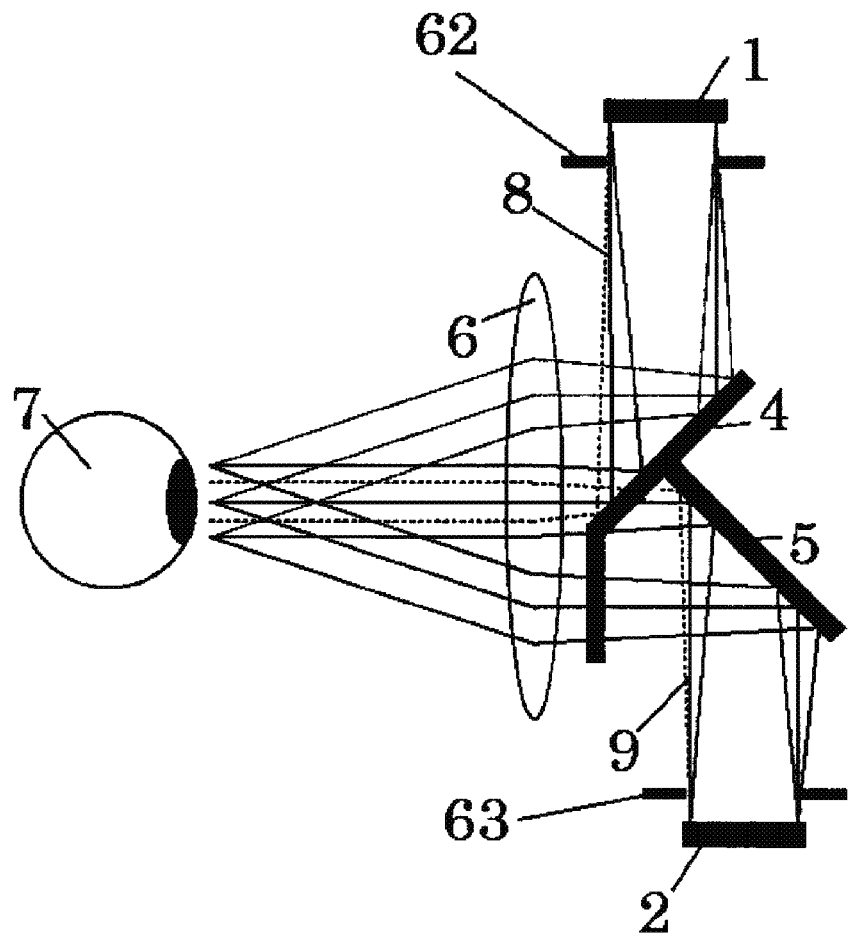
FIG. 4 is a figure for explaining a configuration in which aperture stops are provided in Embodiment 2.

A method of setting the overlapping ratio of the first and second light fluxes 8 and 9 on the exit pupil plane to a predetermined value will hereinafter be described. As shown in FIG. 4, an aperture stop (light-shielding element) 62 is disposed between the first display element 1 and the first optical element 4, and an aperture stop 63 is disposed between the second display element 2 and the second optical element 5.

FIG. 5A shows a shape of the aperture stop 62 when viewed from a first display element side, and FIG. 5B shows a shape of the aperture stop 63 when viewed from a second display element side. In a light-passing area (white area in the figure) of the aperture stop 62, a right part is narrowed with respect to a shape of the exit pupil to limit an area through which the first light flux 8 passes. In a light-passing area of the aperture stop 63, a left part is narrowed with respect to the exit pupil to limit an area through which the second light flux 9 passes.

In this method, moving the aperture stop 62 in a proceeding direction of the first light flux 8 and a direction opposite thereto and the aperture stop 63 in a proceeding direction of the second light flux 9 and a direction opposite thereto makes it possible to vary the overlapping ratio of the first and second light fluxes 8 and 9 on the exit pupil plane.

Another method of setting the overlapping ratio of the first and second light fluxes 8 and 9 on the exit pupil plane to a predetermined value will hereinafter be described. This method limits effective areas of the first and second optical elements 4 and 5. In this method, changing a distance between the first optical element 4 and the ocular lens 6 and a distance between the second optical element 5 and the ocular lens 6 in an optical axis direction makes it possible to vary the overlapping ratio of the first and second light fluxes 8 and 9 on the exit pupil plane.

In addition, the overlapping ratio of the first and second light fluxes 8 and 9 on the exit pupil plane can be set to a predetermined value by using a combination of the above-described two methods.

Such a variable overlapping ratio of the first and second light fluxes 8 and 9 on the exit pupil plane enables compensation of a variation of the overlapping ratio on the exit pupil plane caused due to a manufacturing error of the optical system or a positional displacement between the display element and the optical system. This makes it possible to set the overlapping ratio to a desired predetermined value without producing and assembling the optical system with high accuracy.

Figure 22A:
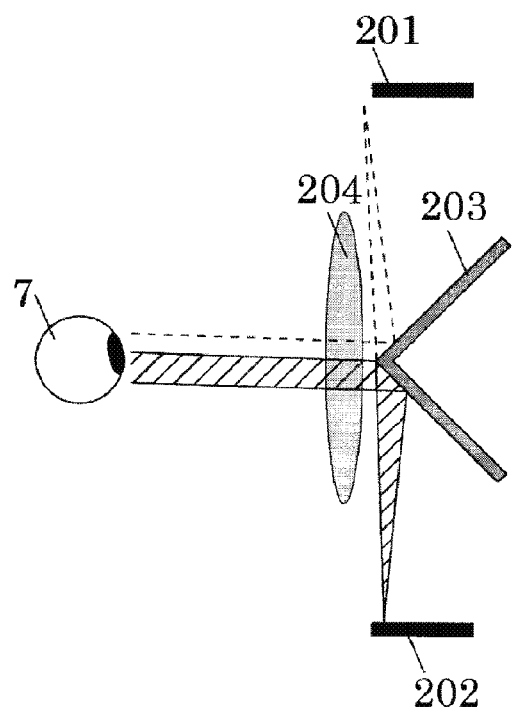
FIGS. 22A and 22B are figures for explaining the conventional problem.
Figure 22B:
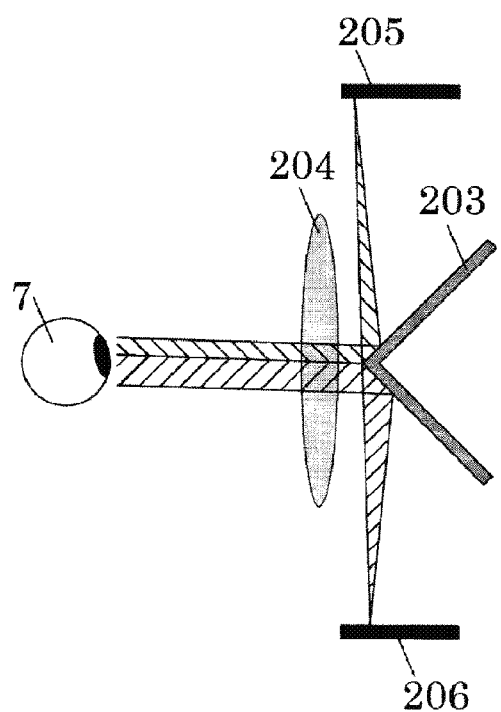

FIG. 6 shows a light flux forming a lower side shallow view angle when the eye 7 is rotated upward in this embodiment, as is the case described in FIG. 22A. In the optical system in this embodiment, of the light flux forming the lower side shallow view angle when the eye 7 is rotated upward, a light flux 74 which is not introduced to the eye 7 in the optical system shown in FIG. 22A is introduced thereto from the second display element 2. Therefore, in the optical system in this embodiment, the problem that part of the light flux is not introduced to the eye (pupil) 7 in the optical system as shown in FIG. 22A is hard to occur. Moreover, in the optical system in this embodiment, the enlargement of the display area of the display element to provide the overlapping area as shown in FIG. 22B is not necessary.

As described above, this embodiment can solve the problem occurring in the conventional optical system in which the light flux forming part of the view angle is not introduced to the eye (pupil).

In Embodiment 2, the overlapping ratio of the first and second light fluxes 8 and 9 on the exit pupil plane of the optical system was calculated under a condition that a light flux should enter at least the half area of the pupil of the eye 7 and the diameter of the pupil of the eye 7 is assumed to be 4 mm. However, a condition that the light flux should enter a 75-percent or more area of the pupil of the eye 7 may be employed. Such a larger area of the pupil into which the light flux should enter enables observation of a brighter enlarged combined image and enables compensation of a gap of a position of the eye with respect to the optical system.

In this case, when assuming that a radius of the pupil of the eye is 2 mm, a 75-percent position of the pupil of the eye observing the direction of the left maximum view angle of 17.5 degrees is located at a position of 4.6 mm away to the left from the center of the pupil of the eye observing the direction of the view angle of 0 degrees. Therefore, it is only necessary to set the overlapping ratio of the first and second light fluxes to 92% of the exit pupil.

Although Embodiment 2 described the case where the horizontal view angle is divided into two, a similar configuration to that of this embodiment can be employed for a case where a vertical view angle is divided into two.

Embodiment 3

Figure 7:
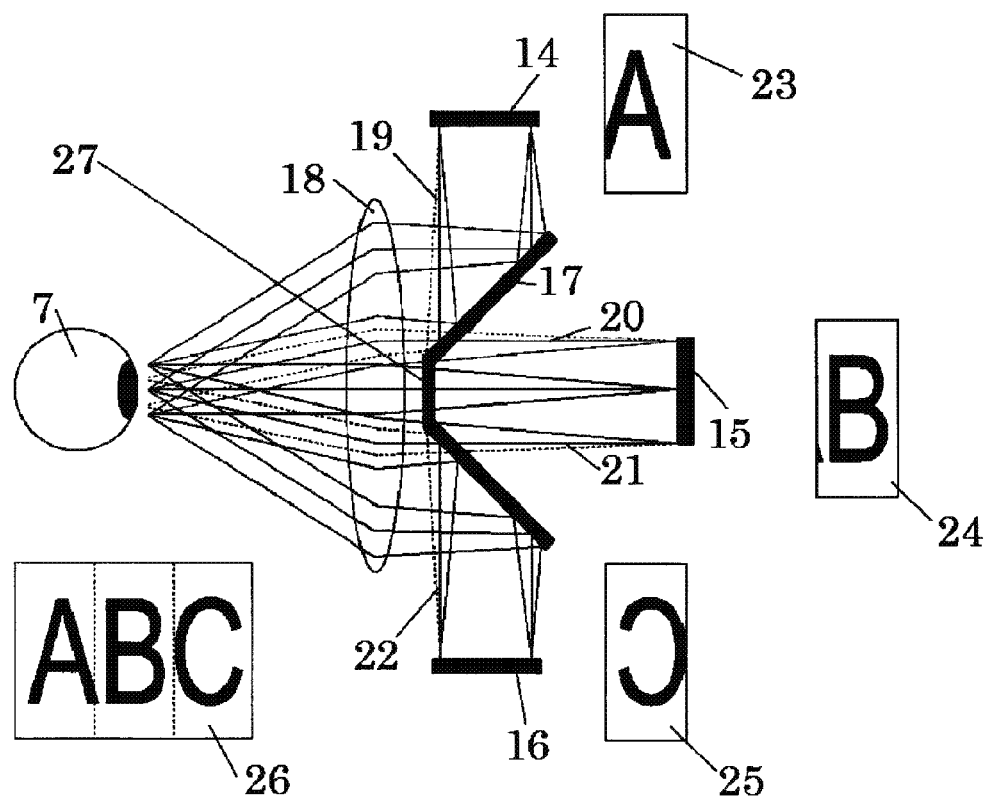
FIG. 7 is a diagrammatic illustration showing an HMD that is Embodiment 3 of the present invention.

FIG. 7 shows an HMD (image display apparatus) that is a third embodiment (Embodiment 3) of the present invention.

The HMD of this embodiment introduces light fluxes from three display elements provided for three view angles divided in a horizontal direction that is a decentering cross-sectional direction of an optical system to an exit pupil of the optical system.

In FIG. 7, reference numeral 14 denotes a first display element, reference numeral 15 denotes a second display element, and reference numeral 16 denotes the third display element. The second display element 15 and the third display element 16 respectively correspond to "a first display element" and "a second display element". Reference numeral 17 denotes an optical element constituted by a half-mirror, and reference numeral 18 denotes an ocular lens. The optical element 17 and the ocular lens 18 constitute an optical system. Reference numeral 7 denotes an observer's eye which is placed at a position of the exit pupil of the optical system or in the vicinity thereof. A cross-section shown in FIG. 7 corresponds to the decentering cross-section.

A light flux (first light flux) 19 that has emerged from an image (first original image) 23 displayed on the first display element 14 is reflected by the optical element 17 and then introduced to the eye 7 through the ocular lens 18 as a light flux forming a left view angle shown in an upper part of the figure. Light fluxes (second light fluxes) 20 and 21 that have emerged from an image (second original image) 24 displayed on the second display element 15 are transmitted through the optical element 17 and then introduced to the eye 7 through the ocular lens 18 as a light flux forming a central view angle. In the second light fluxes 20 and 21, the light flux 20 is overlapped with the first light flux 19 on an exit pupil plane, and the light flux 21 is overlapped with a third light flux 22 on the exit pupil plane, as described below.

A light flux (third light flux) 22 that has emerged from an image (third original image) 25 displayed on the third display element 16 is reflected by the optical element 17 and then introduced to the eye 7 through the ocular lens 18 as a light flux forming a right view angle shown in a lower part of the figure. The left view angle, the central view angle and the right view angle are different view angles from each other.

The optical system presents to the eye 7 an enlarged combined image 26 of the first, second and third original images 23, 24 and 25 with the first light flux 19, the second light fluxes 20 and 21 and the third light flux 22. The second light fluxes 20 and 21 and the third light flux 22 respectively correspond to "a first light flux" and "a second light flux". The second original image 24 and the third original image 25 respectively correspond to "a first original image" and "a second original image".

The optical element 17 through which the second light fluxes 20 and 21 from the second display element 15 are transmitted is provided with a planar portion 27. The planar portion 27 is provided to cause the entire light flux (light rays) from the second display elements 15 to pass through the optical element 17 and to eliminate optical path length differences of the light rays.

Figure 8A:
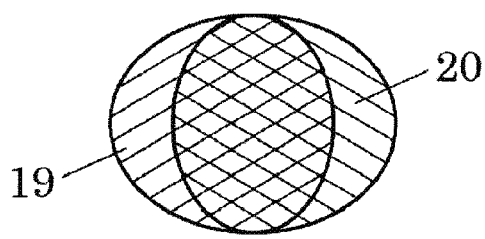
FIGS. 8A and 8B are figures for explaining overlapping of light fluxes on an exit pupil plane in Embodiment 3.

Of the first and second light fluxes 19 and 20 that have respectively emerged from the first and second display elements 14 and 15, partial light fluxes (light flux components) being introduced to a same image point in the enlarged combined image 26 are overlapped with each other on the exit pupil plane as shown in FIG. 8A. On the exit pupil plane, as shown in FIG. 8A, the first light flux 19 forms a left area of the exit pupil, and the second light flux 20 forms a right area thereof. In a central area of the exit pupil, the first and second light fluxes 19 and 20 are overlapped with each other.

Figure 8B:
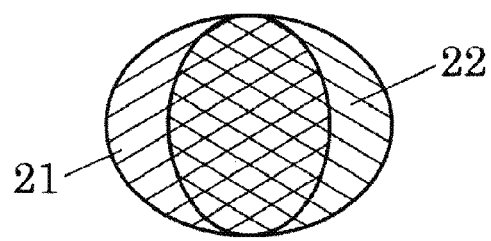

Of the second and third light fluxes 21 and 22 that have respectively emerged from the second and third display elements 15 and 16, partial light fluxes (light flux components) being introduced to a same image point in the enlarged combined image 26 are overlapped with each other on the exit pupil plane as shown in FIG. 8B. On the exit pupil plane, as shown in FIG. 8B, the second light flux 21 forms the left area of the exit pupil, and the third light flux 22 forms the right area thereof. In the central area of the exit pupil, the second and third light fluxes 21 and 22 are overlapped with each other.

Description will hereinafter be made of a case where the optical system divides a horizontal view angle of 60 degrees into three view angles. The first display element 14 displays the first original image 23 corresponding to a view angle of 20 degrees from a left 30-degree view angle to a left 10-degree view angle. The second display element 15 displays the second original image 24 corresponding to a view angle of 20 degrees from the left 10-degree view angle to a right 10-degree view angle. The third display element 16 displays the third original image 25 corresponding to a view angle of 20 degrees from the right 10-degree view angle to a right 30-degree view angle.

In this embodiment, since a joint line of a boundary part of enlarged images corresponding to the respective original images is not located at a center of the enlarged combined image 26, the boundary part is not noticeable to an observer usually observing a central part of the enlarged combined image.

In this optical system, when a diameter of the exit pupil is 15 mm and a radius of rotation of the eye 7 is 12 mm, a center of a pupil of the eye 7 observing a direction of a left maximum view angle of 30 degrees is moved to the left by 6 mm with respect to the center of the pupil of the eye 7 observing a direction of a view angle of 0 degree. In this state, if the second and third light fluxes 20 and 22 are introduced to the center of the pupil of the eye 7, all light rays forming an entire view angle corresponding to the second and third display elements 15 and 16 enter at least a half area of the pupil of the eye 7. Thereby, an optical system can be achieved from which light fluxes (light rays) forming an entire view angle constituted by the view angles corresponding to the first to third display elements 14 to 16 are introduced to the pupil of the eye 7.

Thus, it is only necessary that a horizontal width of each of the second and third light fluxes 20 and 22 be 6 mm on a left side and 7.5 mm on a right side with respect to the exit pupil diameter of 15 mm. Similarly, it is only necessary that a horizontal width of each of the first and second light fluxes 19 and 21 be 7.5 mm on the left side and 6 mm on the right side with respect to the exit pupil diameter of 15 mm.

In this embodiment, the area where the first light flux 19 and the second light flux 20 are overlapped with each other on the exit pupil plane is an 80-percent area of the exit pupil. In other words, the light fluxes 19 and 20 are overlapped with each other at an overlapping ratio of 80% of the exit pupil. In this state, all light flux forming an entire view angle is introduced to the pupil of the eye 7. Therefore, it is unnecessary to provide overlapping areas in the first and second original images 23 and 24 respectively displayed on the first and second display elements 14 and 15. Moreover, an area where the second light flux 21 and the third light flux 22 are overlapped with each other on the exit pupil plane is also an 80-percent area of the exit pupil, and it is unnecessary to provide overlapping areas in the second and third original images 24 and 25 respectively displayed on the second and third display elements 15 and 16. In other words, in a case where the enlarged combined image 26 being observed is formed such that edges of the first to third original images 23 to 25 are jointed to each other as shown in FIG. 7, it is unnecessary to provide the overlapping areas in the first to third original images 23 to 25 as shown in the figure.

In this embodiment as well as in Embodiments 1 and 2, since no overlapping area is provided in each original image, it is possible to efficiently use a display area of each display element, which increases image information presentation efficiency of each display element.

Further, although the overlapping of the light fluxes at the same image point is necessary for observation of a continuous (seamless) enlarged combined image when the eye 7 is rotated, the reduced overlapping ratio described above makes it possible to decrease a thickness of the optical system.

In Embodiment 3, the overlapping ratio of the first and second light fluxes 19 and 20 and the overlapping ratio of the second and third light fluxes 21 and 22 on the exit pupil plane of the optical system were calculated under a condition that the light flux should enter at least the half area of the pupil of the eye 7. However, a condition that the light flux should enter a 75-percent or more area of the pupil of the eye 7 may be employed. Such a larger area of the pupil into which the light flux should enter enables observation of a brighter enlarged combined image and enables compensation of a gap of a position of the eye with respect to the optical system.

In this case, when assuming that a radius of the pupil of the eye is 2 mm, a 75-percent position of the pupil of the eye observing the direction of the left maximum view angle of 30 degrees is located at a position of 6.9 mm away to the left from the center of the pupil of the eye observing the direction of the view angle of 0 degrees. Therefore, it is only necessary to set the overlapping ratio of the first and second light fluxes to about 92% of the exit pupil. The same is applied to the overlapping ratio of the second and third light fluxes.

Figure 9:
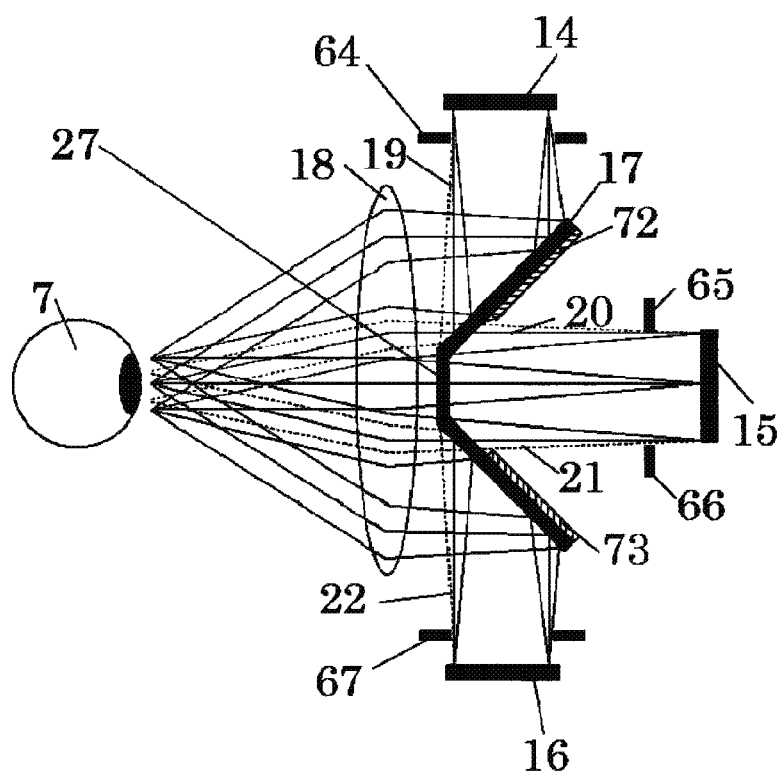
FIG. 9 is a figure for explaining a configuration in which aperture stops, stoppers and light-shielding elements are provided in Embodiment 3.

A method of setting the overlapping ratio of the first and second light fluxes 19 and 20 and the overlapping ratio of the second and third light fluxes 21 and 22 on the exit pupil plane to predetermined values will hereinafter be described. As shown in FIG. 9, an aperture stop (light-shielding element) 64 is disposed between the first display element 14 and the optical element 17, and a stopper (light-shielding element) 65 and a stopper 66 are disposed between the second display element 15 and the optical element 17. Further, an aperture stop 67 is disposed between the third display element 16 and the optical element 17.

Figure 10A:
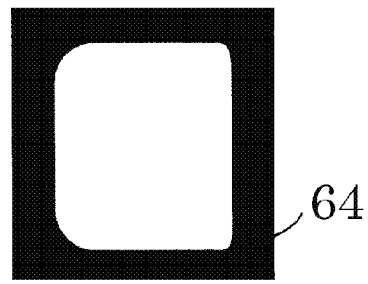
FIGS. 10A to 10D are figures for explaining shapes of the aperture stops and the stoppers in Embodiment 3.
Figure 10B:
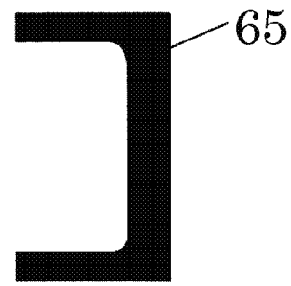
Figure 10C:
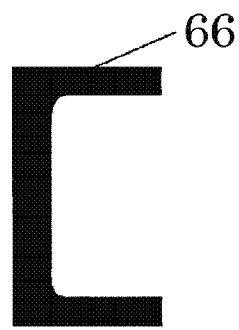
Figure 10D:
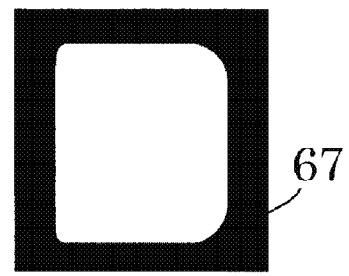

FIG. 10A shows a shape of the aperture stop 64 when viewed from a first display element side, and FIGS. 10B and 10C respectively show shapes of the stopper 65 and 66 when viewed from a second display element side. FIG. 10D shows a shape of the aperture stop 67 when viewed from a third display element side.

In a light-passing area (white area in the figure) of the aperture stop 64, a right part is narrowed with respect to a shape of the exit pupil to limit an area through which the first light flux 19 passes. In a light-passing area of the aperture stop 67, a left part is narrowed with respect to the shape of the exit pupil to limit an area through which the third light flux 22 passes.

Further, the stopper 65 narrows a left part of an area through which the second light flux 20 passes, and the stopper 66 narrows a right part of an area through which the second light flux 21 passes.

In this method, moving the aperture stop 64 in a proceeding direction of the first light flux 19 and a direction opposite thereto and the stopper 65 in a proceeding direction of the second light flux 20 and a direction opposite thereto makes it possible to vary the overlapping ratio of the first and second light fluxes 19 and 20 on the exit pupil plane. Similarly, moving the stopper 66 in a proceeding direction of the second light flux 21 and a direction opposite thereto and the aperture stop 67 in a proceeding direction of the third light flux 22 and a direction opposite thereto makes it possible to vary the overlapping ratio of the second and third light fluxes 21 and 22 on the exit pupil plane.

Another method of setting the overlapping ratio of the first and second light fluxes 19 and 20 and the overlapping ratio of the second and third light fluxes 21 and 22 on the exit pupil plane to predetermined values will hereinafter be described. This method limits an effective area on a half-mirror surface of the optical element 17. In this method, changing a distance between the optical element 17 and the ocular lens 18 in an optical axis direction makes it possible to vary the overlapping ratio. In addition, the overlapping ratio can be set to a predetermined value by using a combination of the above-described two methods. Such variable overlapping ratios provide effects similar to those of Embodiment 2.

In a case where an entire surface of the optical element 17 is formed as a half-mirror, it is necessary to consider influences of light flux components, being transmitted through the optical element 17, of the first light flux 19 from the first display element 14 and the third light flux 22 from the third display element 16. The light flux component emerging from the first display element 14 and being transmitted through the optical element 17 is transmitted through the optical element 17 again and then reflected by the third display element 16 to become a ghost. The ghost is observed by the observer. The same is applied to the light flux component emerging from the third display element 16 and being transmitted though the optical element 17. Therefore, it is necessary to prevent the light flux components emerging from the first and third display elements 14 and 16 from being transmitted through the optical element 17.

Thus, it is desirable to provide black painted light-shielding elements 72 and 73 to non-transmission areas of a surface opposite to an eye side surface of the optical element 17, the non-transmission area being other area than an area through which the light flux from the second display element 15 is transmitted, as shown in FIG. 9.

Although Embodiment 3 described the case where the optical system divides the horizontal view angle into three, an optical system may be used which divides a vertical view angle into three. Further, the optical system in Embodiment 3 may include a reflective surface disposed between the second display element 15 and the optical element 17 to fold optical paths in the optical system to reduce a thickness of the optical system. In this case, the second display element 15 is disposed at a position nearer or farther than the paper of FIG. 9.

Embodiment 4

Description will be made of definitions of a meridional cross-section, a sagittal cross-section, a local meridional cross-section and a local sagittal cross-section, which are used in a fourth embodiment (Embodiment 4) and subsequent embodiments. In definitions in a conventional system which does not correspond to a decentering system of this and subsequence embodiments, when defining a z-axis of a surface apex coordinate system as an optical axis, a y-z cross-section corresponds to a conventional meridional cross-section and an x-z cross-section corresponds to a conventional sagittal cross-section. Since the optical systems of this and subsequent embodiments are decentering optical systems, the local meridional cross-section and the local sagittal cross-section are newly defined as follows.

The local meridional cross-section is defined as a plane (cross-section) including a hit point(s) of a central view angle principal ray (that is, a light ray emerging from the center of the original image displayed on the display element and then reaching the center of the exit pupil of the optical system) at each surface and further including an entering ray portion and an exiting ray portion of the central view angle principal ray.

The local sagittal cross-section is defined as a plane (cross-section) including the hit point(s), being orthogonal to the local meridional cross-section and being parallel to the conventional (normal) sagittal cross-section in the surface apex coordinate system.

Figure 11:
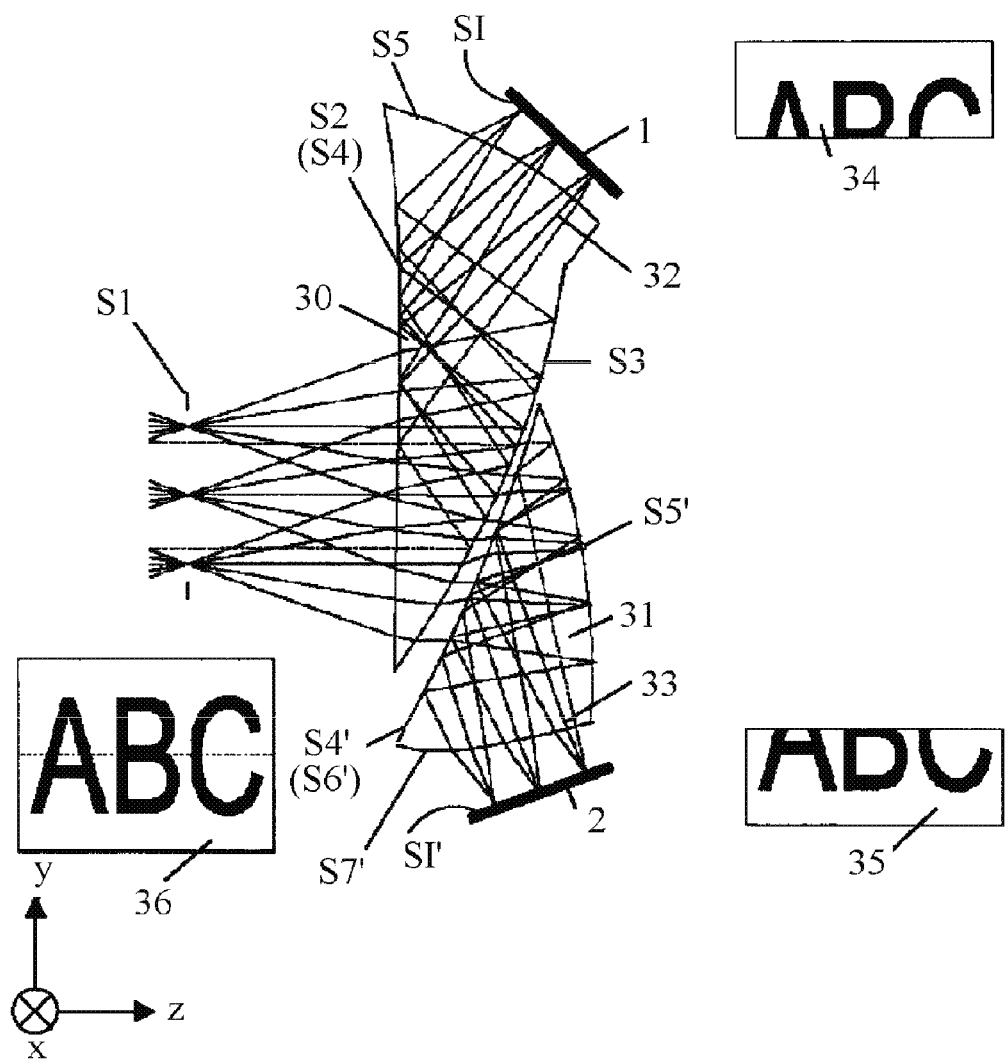
FIG. 11 is a diagrammatic illustration showing an HMD that is Embodiment 4 of the present invention.

FIG. 11 shows an HMD (image display apparatus) that is Embodiment 4 of the present invention. The HMD of this embodiment introduces light fluxes from two display elements 1 and 2 provided for two view angles divided in a vertical direction that is a direction of the decentering cross-section of the optical system to an exit pupil thereof.

The "decentering cross-section" in this embodiment is a cross-section on which optical paths of the central view angle principal rays are turned by reflections at a half-mirror surface S3 and a mirror surface S5', which corresponds to the cross-section shown in FIG. 11. The same is applied to the subsequent embodiments.

This embodiment divides the view angle in the local meridional cross-section corresponding to the decentering cross-section of the optical system, which enables reduction in size and thickness of the optical system.

As shown in FIG. 11, this embodiment provides plural decentered reflective curved surfaces in each of first and second optical elements 30 and 31 to fold an optical path from each of the first and second display elements 1 and 2, which enables further reduction in thickness of the optical system than those in Embodiments 1 to 3. Moreover, the use of the decentered reflective curved surface enables reduction of the number of surfaces while increasing an optical power of the optical system, which is further effective for the reduction in size and thickness of the optical system.

In this and subsequent embodiments, reference symbols are added in an order reverse to an original order in which light fluxes emerge from the display elements 1 and 2 and then reach the exit pupil of the optical system (that is, in an order of reverse ray tracing).

In FIG. 11, each of the first and second optical elements 30 and 31 is constituted by a prism as a transparent member whose inside is filled with an optical medium having a refractive index larger than 1, such as glass or plastic. The first optical element 30 has three surfaces S2(S4), S3 and S5. The second optical element 31 has three surfaces S4'(S6'), S5' and S7'. The surface S2 and the surface S4 are formed as a same surface, and the surface S4' and the surface S6' are formed as a same surface. A surface SI and a surface SI' are display surfaces of the first and second display elements 1 and 2, and reference symbol S1 denotes the exit pupil.

A first light flux 32 that has emerged from a first original image 34 displayed on the first display element 1 enters the first optical element 30 through the surface S5, is reflected by the surface S4 and the surface S3, and then exits the first optical element 30 through the surface S2 to be introduced to an eye (exit pupil S1). A second light flux 33 that has emerged from a second original image 35 displayed on the second display element 2 enters the second optical element 31 through the surface S7', is reflected by the surface S6' and the surface S5', an then exits the second optical element 31 through the surface S4'. Thereafter, the second light flux 33 passes through an air layer between the surface S4' and the surface S3, enters the first optical element 30 through the surface S3, and then exits the first optical element 30 through the surface S2 to be introduced to the eye (exit pupil S1).

It is desirable that the reflection at the surface S4 of the first optical element 30 and the reflection at the surface S6' of the second optical element 31 be internal total reflection in each prism. Such internal total reflection reduces a light amount loss to enable presentation of a bright enlarged combined image 36.

Figure 12:
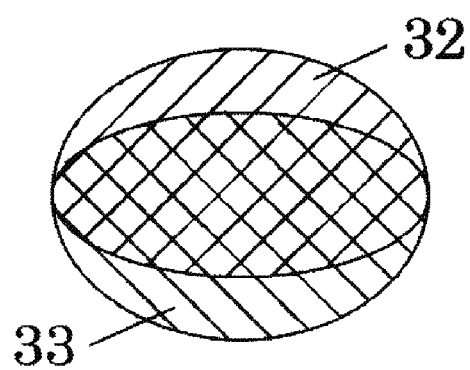
FIG. 12 is a figure for explaining overlapping of light fluxes on an exit pupil plane in Embodiment 4.

Of the first light flux 32 from the first display element 1 and the second light flux 33 from the second display element 2, partial light fluxes (light flux components) being introduced to a same point in the enlarged combined image 36 are overlapped with each other on an exit pupil plane as shown in FIG. 12. On the exit pupil plane, the first light flux 32 forms an upper area of the exit pupil, and the second light flux 33 forms a lower area of the exit pupil. In addition, the first light flux 32 and the second light flux 33 are overlapped with each other in a central area of the exit pupil.

Description will hereinafter be made of a case where the optical system divides a vertical view angle of 38 degrees into two view angles and a vertical width (diameter) of the exit pupil is 9.6 mm. In this optical system, when a radius of rotation of the eye is 12 mm, a center of a pupil of the eye observing a direction of an upper maximum view angle of 19 degrees is moved upward by 3.9 mm with respect to the center of the pupil of the eye observing a direction of a view angle of 0 degree.

In this state, if the second light flux 33 is introduced to the center of the pupil of the eye, all light rays forming an entire view angle corresponding to the second display element 2 enter at least a half area of the pupil of the eye. Thereby, an optical system can be achieved from which light fluxes (light rays) forming an entire view angle constituted by the view angles corresponding to the first and second display elements 1 and 2 are introduced to the pupil of the eye.

Thus, it is only necessary that a vertical width of the second light flux 33 be 3.9 mm on an upper side and 4.8 mm on a lower side with respect to the exit pupil diameter of 9.6 mm. Similarly, it is only necessary that a vertical width of the first light flux 32 be 4.8 mm on the upper side and 3.9 mm on the lower side with respect to the exit pupil diameter of 9.6 mm.

In this embodiment, the area where the first light flux 32 and the second light flux 33 are overlapped with each other on the exit pupil plane is approximately an 81-percent (b/a=0.81) area of the exit pupil. In other words, the first light flux 32 and the second light flux 33 are overlapped with each other at an overlapping ratio of approximately 81% of the exit pupil. In such a state, the light fluxes forming the entire view angle are introduced to the pupil of the eye.

Therefore, it is unnecessary to provide overlapping areas in the first and second original images 34 and 35 respectively displayed on the first and second display elements 1 and 2. In other words, in a case where the enlarged combined image 36 being observed is formed such that edges of the first and second original images 34 and 35 are jointed to each other as shown in FIG. 11, it is unnecessary to provide the overlapping areas in the first and second original images 34 and 35 as shown in the figure.

Providing no overlapping area in the first and second original images 34 and 35 makes it possible to efficiently use a display area of each display element, which increases image information presentation efficiency of each display element.

Further, although the overlapping of the light fluxes at the same image point is necessary for observation of a continuous (seamless) enlarged combined image when the eye is rotated, the reduced overlapping ratio described above makes it possible to decrease the thickness of the optical system.

A method of setting the overlapping ratio of the first and second light fluxes 32 and 33 on the exit pupil plane to a predetermined value will hereinafter be described. As shown in FIG. 13, a stopper (light-shielding element) 68 is disposed between the first display element 1 and the first optical element 30, and a stopper 69 is disposed between the second display element 2 and the second optical element 31.

FIG. 14A shows a shape of the stopper 68 when viewed from a first display element side, and FIG. 14B shows a shape of the stopper 69 when viewed from a second display element side. The stopper 68 limits passage of a lower part of the first light flux 32, and the stopper 69 limits passage of an upper part of the second light flux 33. In this method, moving the stopper 68 in a proceeding direction of the first light flux 32 and a direction opposite thereto and the stopper 69 in a proceeding direction of the second light flux 33 and a direction opposite thereto makes it possible to vary the overlapping ratio of the first and second light fluxes 32 and 33 on the exit pupil plane.

Disposing the stopper 69 between the first optical element 30 and the second optical element 31 provides a similar effect to that in the above-described case.

Alternatively, effective areas of the surface S5 of the first optical element 30 and the surface S7' of the second optical element 31 may be limited by a light-shielding element such as a black painted member.

In addition, as for the second light flux 33, in order to set the overlapping ratio on the exit pupil plane to a predetermined value, an effective area of the surface S5' of the second optical element 31 may be limited.

Further, the overlapping ratio of the first and second light fluxes 32 and 33 on the exit pupil plane can be set to a predetermined value by using a combination of the above-described two methods. Such a variable overlapping ratio can provide a similar effect to those in Embodiments 2 and 3.

In this embodiment, the surface S3 of the first optical element 30 is constituted by a half-mirror surface to introduce the first and second light fluxes 32 and 33 emerging from the first and second display elements 1 and 2 with a same luminance to the exit pupil. However, the area of the exit pupil plane where the first and second light fluxes 32 and 33 are overlapped with each other has a luminance twice as high as those of other areas, and therefore it is desirable to provide a light amount reducing element such as a neutral density (ND) filter on an optical path on which the first and second light fluxes 32 and 33 pass. Alternatively, a luminance of the overlapping areas of the two original images corresponding to the area on the exit pupil plane where the first and second light fluxes 32 and 33 are overlapped with each other may be reduced.

Moreover, forming all the surfaces of the first and second optical elements 30 and 31 as curved surfaces causes these surfaces to contribute to condensing of light, diverging of light or aberration correction, which enables elimination of an unnecessary surface in the optical system.

More preferably, all the surfaces of the first and second optical elements 30 and 31 may be formed to have a non-rotationally symmetric shape. This increases a degree of freedom of decentering aberration correction to enable presentation of an enlarged combined image having an excellent image quality.

In this case, forming each non-rotationally symmetric surface into a plane symmetric shape in a direction of the local sagittal cross-section with respect to the local meridional cross-section as a unique symmetry plane preferably makes it possible to facilitate forming and producing of the non-rotationally symmetric surface, as compared with a case of not forming it into such a plane symmetric shape.

The subsequent embodiments are the same in that the stopper or the light amount reducing element is provided, the effective area of the optical element is limited and each surface is preferably formed as a non-rotationally symmetric surface.

Table 1 shows optical data of this embodiment when the surfaces S2 to S5 and the surfaces S4' to S7' are non-rotationally symmetric surfaces whose unique symmetry plane is a paper (y-z cross-section) of FIG. 11.

TABLE 1

| SURF | X | Y | Z | A | Rx | Ry | TYP | Nd | vd |
|---|---|---|---|---|---|---|---|---|---|
| 1 | 0 | 0 | 0 | 0 | | | | | |
| 2 | 0 | −31.15 | 14.584 | 1.031 | −0.0005 | −0.0005 | FFS1-1 | 1.5767 | 33.8 |
| 3 | 0 | −21.14 | 7.437 | −42.17 | −74.9125 | −104.4125 | FFS2-2 | −1.5767 | 33.8 |
| 4 | 0 | −31.15 | 14.584 | 1.031 | −0.0005 | −0.0005 | FFS1-1 | 1.5767 | 33.8 |
| 5 | 0 | 20.665 | 27.315 | 44.899 | −14.879 | −16.2165 | FFS2-3 | 1 | |
| I | 0 | 24.188 | 26.754 | 43.595 | | | | | |
| 4' | 0 | −15.92 | 15.476 | −28.38 | −267.9589 | −267.9589 | FFS1-4 | 1.5767 | 33.8 |
| 5' | 0 | −0.547 | 27.672 | 13.901 | −61.5436 | −52.3869 | FFS2-5 | −1.5767 | 33.8 |
| 6' | 0 | −15.92 | 15.476 | −28.38 | −267.9589 | −267.9589 | FFS1-4 | 1.5767 | 33.8 |
| 7' | 0 | −15.67 | 29.329 | −75.18 | −21.7392 | −56.7998 | FFS2-6 | 1 | |
| I' | 0 | −19.17 | 26.177 | −68.76 | | | | | |

| | | | | | | | | | |
|---|---|---|---|---|---|---|---|---|---|
| FFS1-1 | c1 | −1.77E+18 | c5 | 1.20E−05 | c6 | 3.32E−04 | c10 | 2.99E−06 | |
| | c11 | 3.82E−06 | c12 | −4.37E−08 | c13 | −2.06E−08 | c14 | −4.28E−09 | |
| | c20 | −1.21E−10 | c21 | −1.75E−10 | c22 | −5.24E−10 | c23 | 1.15E−11 | |
| | c24 | 3.46E−12 | c25 | 1.56E−12 | c26 | −2.33E−12 | | | |
| FFS2-2 | cx1 | −1.04E+02 | cy1 | −7.49E+01 | c5 | −1.84E+00 | c6 | −5.24E−01 | |
| | c10 | −4.48E−04 | c11 | −3.14E−04 | c12 | −4.91E−06 | c13 | −4.66E−06 | |
| | c14 | 8.53E−08 | c20 | 1.29E−07 | c21 | 2.06E−09 | c22 | −6.10E−12 | |
| | c23 | 1.43E−09 | c24 | 1.88E−09 | c25 | −3.64E−11 | c26 | −2.70E−11 | |
| FFS2-3 | cx1 | −2.65E+00 | cy1 | −9.94E−01 | c5 | −7.34E−03 | c6 | −3.06E−03 | |
| | c10 | 1.91E−04 | c11 | 4.56E−04 | c12 | 4.57E−06 | c13 | 1.88E−06 | |
| | c14 | 2.95E−06 | c20 | −2.48E−07 | c21 | −5.71E−07 | c22 | −1.03E−06 | |
| | c23 | −1.51E−08 | c24 | 9.72E−09 | c25 | 9.19E−09 | c26 | 7.22E−09 | |
| FFS1-4 | c1 | 4.07E+01 | c5 | 4.97E−04 | c6 | −7.44E−04 | c10 | −8.08E−06 | |
| | c11 | 2.02E−06 | c12 | 1.21E−07 | c13 | −5.72E−08 | c14 | −5.25E−08 | |
| | c20 | 2.78E−10 | c21 | −3.25E−09 | c22 | 6.84E−10 | c23 | 1.30E−10 | |
| | c24 | 4.19E−11 | c25 | −3.24E−11 | c26 | 8.40E−12 | | | |
| FFS2-5 | cx1 | −8.50E−01 | cy1 | 1.58E+00 | c5 | −1.58E−04 | c6 | −7.85E−04 | |
| | c10 | −1.41E−05 | c11 | −6.26E−06 | c12 | 6.79E−07 | c13 | 1.51E−09 | |
| | c14 | −2.84E−08 | c20 | −8.78E−09 | c21 | −2.26E−09 | c22 | 2.12E−09 | |
| | c23 | 6.18E−10 | c24 | −3.03E−10 | c25 | −1.68E−10 | c26 | −1.53E−11 | |
| FFS2-6 | cx1 | 2.82E−01 | cy1 | −2.28E+01 | c5 | −9.04E−03 | c6 | −1.60E−03 | |
| | c10 | −1.13E−04 | c11 | −3.81E−04 | c12 | −1.62E−05 | c13 | −1.08E−05 | |
| | c14 | −1.94E−06 | c20 | 3.78E−07 | c21 | 2.84E−07 | c22 | −2.22E−07 | |
| | c23 | 5.28E−08 | c24 | 2.81E−08 | c25 | 3.88E−08 | c26 | 1.82E−08 | |

In Table 1, a most left item "SURF" represents a surface number. "X", "Y" and "Z" represent positions of an apex of each surface on an x-axis, a y-axis and the z-axis in a coordinate system in which a center of the surface S1 is defined as an origin (0, 0, 0) and the x-axis, the y-axis and the z-axis are defined as shown in FIG. 11. "A" represents a tilt angle (degree) around the x-axis when a counterclockwise direction in FIG. 11 is defined as a positive direction.

"Rx" represents a curvature radius in a direction of the x-axis, and "Ry" represents a curvature radius in a direction of the y-axis. "TYP" represents a type of a surface shape, and "FFS1" shows that the surface is a non-rotationally symmetric surface according to the following expression (1), and "FFS2" shows that the surface is a non-rotationally symmetric surface according to the following expression (2).

$$FFS1:$$
$$z = (1/R) * (x^2 + y^2) / \left(1 + (1 - (1+c1)*(1/R)^2 * (x^2+y^2))^{(1/2)}\right) + c2 +$$
$$c4*y + c5*(x^2 - y^2) + c6*(-1 + 2*x^2 + 2*y^2) +$$
$$c10*(-2*y + 3*x^2*y + 3*y^3) +$$
$$c11*(3*x^2*y - y^3) c12*(x^4 - 6*x^2*y^2 * y^4) +$$
$$c13*(-3*x^2 + 4*x^4 + 3*y^2 - 4*y^4) + C14*$$
$$(1 - 6*x^2 + 6*x^4 - 6*y^2 + 12*x^2*y^2 + 6*y^4) +$$
$$c20*(3*y - 12*x^2*y + 10*x^4*y -$$
$$12*y^3 + 20*x^2*y^3 - 10*y^5) +$$
$$c21*(-12*x^2*y + 15*x^4*y + 4*y^3 +$$
$$10*x^2*y^3 - 5*y^5) +$$
$$c22*(5*x^4*y - 10*x^2*y^3 + y^5) +$$
$$c23(x^6 - 15*x^4*y^2 + 15*x^2*y^4 - y^6) +$$
$$c24*(-5*x^4 + 6*x^6 + 30*x^2*y^2 -$$
$$30*x^4*y^2 - 5*y^4 - 30*x^2*y^4 + 6*y^6) +$$
$$c25*(6*x^2 - 20*x^4 + 15*x^6 - 6*y^2 +$$
$$15*x^4*y^2 + 20*y^4 - 15*x^2*y^4 - 15*y^6) +$$
$$c26*(-1 + 12*x^2 - 30*x^4 + 20*x^6 +$$
$$12*y^2 - 60*x^2*y^2 + 60*x^4*y^2 -$$
$$30*y^4 + 60*x^2*y^4 + 20*y^6) + \ldots$$

Expression (1)

$$FFS2:$$
$$z = \left((1/Rx)*x^2 + (1/Ry)*y^2\right) / \left(1 + \left(1 - (1+cx1)*(1/Rx)^2 * x^2 - (1+cy1)*(1/Ry)^2*y^2\right)^{(1/2)}\right) + c2 + c4*y +$$
$$c5*(x^2 - y^2) + c6*(-1 + 2*x^2 + 2*y^2) +$$
$$c10*(-2*y + 3*x^2*y + 3*y^3) +$$
$$c11*(3*x^2*y - y^3) +$$
$$c12*(x^4 - 6*x^2*y^2 * y^4) +$$
$$c13*(-3*x^2 + 4*x^4 + 3*y^2 - 4*y^4) + c14*$$
$$(1 - 6*x^2 + 6*y^2 + 12*x^2*y^2 + 6*y^4) +$$
$$c20*(3*y - 12*x^2*y + 10*x^4*y -$$
$$12*y^3 + 20*x^2*y^3 + 10*y^5) +$$
$$c21*(-12*x^2*y + 15*x^4*y +$$
$$4*y^3 + 10*x^2*y^3 - 5*y^5) +$$
$$c22*(5*x^4*y - 10*x^2*y^3 + y^5) +$$
$$c23*(x^6 - 15*x^4*y^2 + 15*x^2*y^4 - y^6) +$$
$$c24*(-5*x^4 + 6*x^6 + 30*x^2*y^2 - 30*x^4 *$$
$$y^2 - 5*y^4 - 30*x^2*y^4 + 6*y^6) +$$
$$c25*(6*x^2 - 20*x^4 + 15*x^6 - 6*y^2 +$$
$$15*x^4*y^2 + 20*y^4 -$$
$$15*x^2*y^4 - 15*y^6) +$$
$$c26*(-1 + 12*x^2 - 30*x^4 + 20*x^6 +$$
$$12*y^2 - 60*x^2*y^2 + 60*x^4*y^2 -$$
$$30*y^4 + 60*x^2*y^4 + 20*y^6) + \ldots$$

Expression (2)

A numerical value written next to "FFS1" or "FFS2" in the column of "TYP" shows that the surface shape is a non-rotationally symmetric shape corresponding to an aspheric coefficient ci written in the lower part of the table. "Nd" and "vd" (written as vd in Table 1) respectively represent a refractive index and an Abbe constant for a d-line of a medium subsequent to the surface. A change in sign of the refractive index Nd shows that light is reflected at the surface. When the medium is air, only the refractive index Nd is written as 1. "E⊥M" means "$\times 10^{\pm M}$".

In this embodiment, the exit pupil has an oval shape, a short axis thereof in the vertical direction has a length of 9.6 mm, and a long axis thereof in the horizontal direction has a length of 12 mm. The display area where the original image is displayed in each of the first and second display elements 1 and 2 has a diagonal size of about 0.57 inches (12.8 mm×6.6 mm). The optical system in this embodiment is a displaying optical system that displays the enlarged combined image 36 at an infinitely far position in a positive direction on the z-axis with a horizontal view angle of 50 degrees and a vertical view angle of 38 degrees.

In this embodiment, two 19-degree vertical view angles of the entire vertical view angle are respectively displayed by the two display elements 1 and 2, and on the other hand, the 50-degree horizontal view angle is displayed by each of the display elements 1 and 2 because the horizontal view angle is not divided.

Embodiment 5

Figure 15:
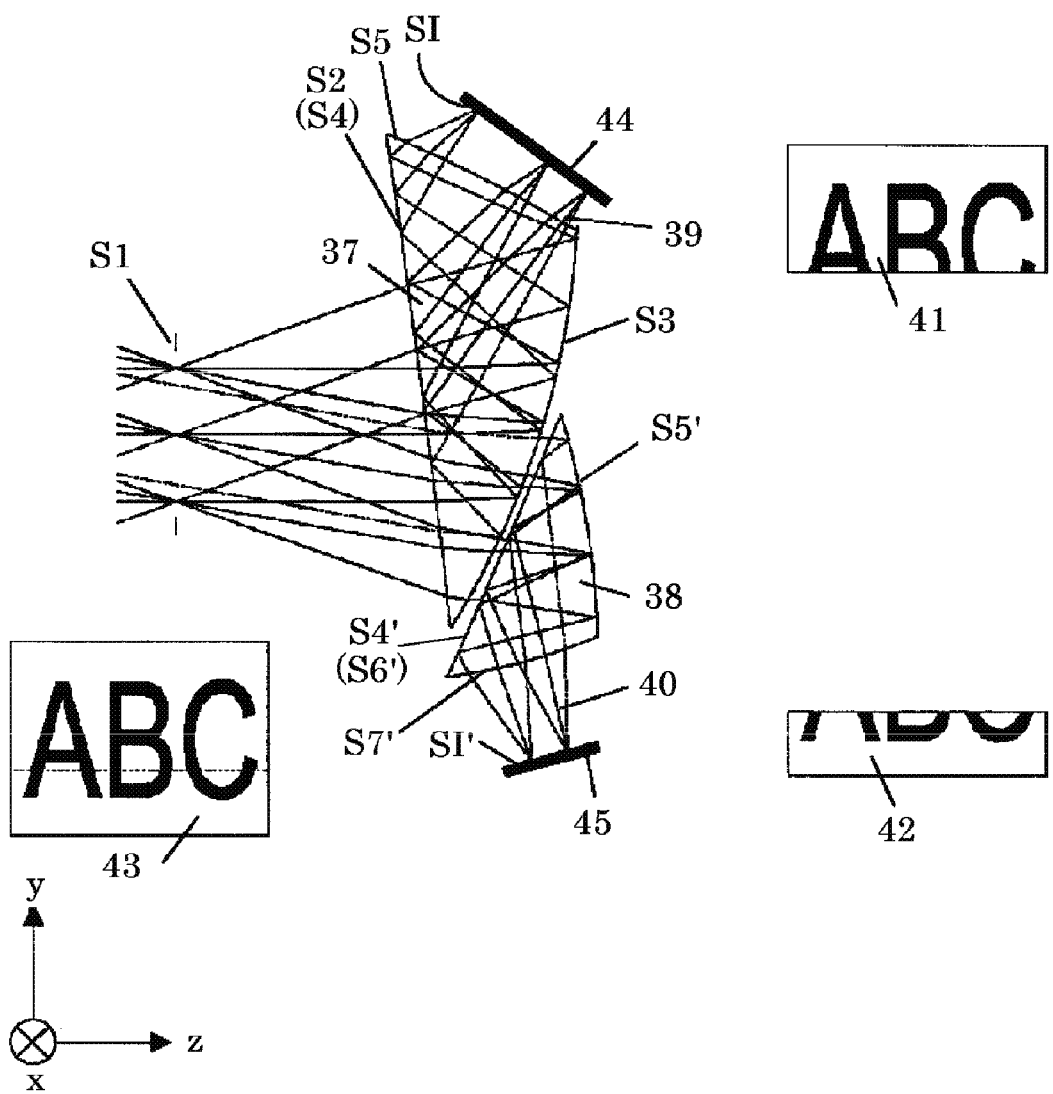
FIG. 15 is a diagrammatic illustration showing an HMD that is Embodiment 5 of the present invention.

FIG. 15 shows an HMD (image display apparatus) that is a fifth embodiment (Embodiment 5) of the present invention. The HMD of this embodiment, as in Embodiment 4, introduces light fluxes from two display elements 44 and 45 provided for two view angles divided in the vertical direction that is the direction of the decentering cross-section of its optical system to an exit pupil thereof. However, in this embodiment, an upper view angle and a lower view angle respectively corresponding to the two display elements 44 and 45 are different in size from each other. Specifically, the upper view angle corresponding to the first display element 44 is 29 degrees, and the lower view angle corresponding to the second display element 45 is 9 degrees.

Reference numerals 37 and 38 respectively denote a first optical element and a second optical element, each being formed as a prism. The first optical element 37 has three surfaces S2(S4), S3 and S5. The second optical element 38 has three surfaces S4'(S6'), S5' and S7'. The surface S2 and the surface S4 are formed as a same surface, and the surface S4' and the surface S6' are formed as a same surface. The surface SI and the surface SI' are display surfaces of the first and second display elements 44 and 45. Reference character S1 denotes an exit pupil. FIG. 15 shows the decentering cross-section. Optical paths and optical actions in this embodiment are similar to those in Embodiment 4.

It is desirable that reflection at the surface S4 of the first optical element 37 and reflection at the surface S6' of the second optical element 38 be internal total reflection in each prism. Such internal total reflection reduces a light amount loss to enable present a bright enlarged combined image 43.

Figure 16:
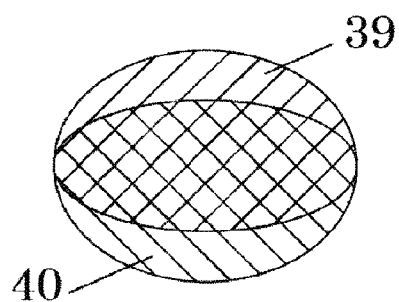
FIG. 16 is a figure for explaining overlapping of light fluxes on an exit pupil plane in Embodiment 5.

Of a first light flux 39 from the first display element 44 and a second light flux 40 from the second display element 45, partial light fluxes (light flux components) being introduced to a same point in the enlarged combined image 43 are overlapped with each other on an exit pupil plane as shown in FIG. 16. On the exit pupil plane, the first light flux 39 forms an upper area of the exit pupil, and the second light flux 40 forms a lower area of the exit pupil. In addition, the first light flux 39 and the second light flux 40 are overlapped with each other in a central area of the exit pupil.

As described above, this embodiment allocates the upper view angle of 29 degrees of the entire vertical view angle of 38 degrees to the first display element 44 and the lower view angle of 9 degrees thereof to the second display element 45. A vertical width (diameter) of the exit pupil is 9.6 mm.

In this optical system, when a radius of rotation of an eye is 12 mm, a center of a pupil of the eye observing a direction of an upper maximum view angle of 19 degrees is moved upward by 3.9 mm with respect to the center of the pupil of the eye observing a direction of a view angle of 0 degree. In this state, if the second light flux 40 is introduced to the center of the pupil of the eye, all light rays forming the entire view angle corresponding to the second display element 45 enter at least a half area of the pupil of the eye. Thereby, an optical system can be achieved from which light fluxes (light rays) forming the entire view angle constituted by the view angles corresponding to the first and second display elements 44 and 45 are introduced to the pupil of the eye.

Thus, it is only necessary that a vertical width of the second light flux 40 be 3.9 mm on an upper side and 4.8 mm on a lower side with respect to the exit pupil diameter of 9.6 mm. Similarly, it is only necessary that a vertical width of the first light flux 39 be 4.8 mm on the upper side and 3.9 mm on the lower side with respect to the exit pupil diameter of 9.6 mm.

In this embodiment, the area where the first light flux 39 and the second light flux 40 are overlapped with each other on the exit pupil plane is approximately an 81-percent (b/a=0.81) area of the exit pupil. In other words, the first light flux 39 and the second light flux 40 are overlapped with each other at an overlapping ratio of approximately 81% of the exit pupil. In such a state, the light fluxes forming the entire view angle are introduced to the pupil of the eye.

Therefore, it is unnecessary to provide overlapping areas in first and second original images 41 and 42 respectively displayed on the first and second display elements 44 and 45. In other words, in a case where the enlarged combined image 43 being observed is formed such that edges of the first and second original images 41 and 42 are jointed to each other as shown in FIG. 15, it is unnecessary to provide the overlapping areas in the first and second original images 41 and 42 as shown in the figure.

Providing no overlapping area in the first and second original images 41 and 42 makes it possible to efficiently use a display area of each display element, which increases image information presentation efficiency of each display element.

Further, although the overlapping of the light fluxes at the same image point is necessary for observation of a continuous (seamless) enlarged combined image when the eye is rotated, the reduced overlapping ratio described above makes it possible to decrease the thickness of the optical system.

Differentiating the sizes of the view angles allocated to the first and second display elements 44 and 45 as described above enables reduction in size of the second optical element 38 even though slightly increasing the size of the first optical element 37, which makes it possible to reduce the thickness of the overall optical system. Moreover, arbitrary setting of the sizes of the view angles thus divided makes it possible to differentiate the sizes of the display elements 44 and 45, which increases a degree of freedom for selecting display elements being used. Further, since a joint line of a boundary part of enlarged images corresponding to the respective original images is not located at a center of the enlarged combined image 43, the boundary part is not noticeable to an observer observing a central part of the enlarged combined image 43.

Table 2 shows optical data of this embodiment when the surfaces S2 to S5 and the surfaces S4' to S7' are spherical surfaces. The spherical surface is shown by "SPH" in the column of "TYP".

TABLE 2

| SURF | X | Y | Z | A | R | TYP | Nd | νd |
|---|---|---|---|---|---|---|---|---|
| 1 | 0 | 0 | 0 | 0 | | | | |
| 2 | 0 | −15 | 20 | 6.2 | −850 | SPH | 1.4922 | 57.5 |
| 3 | 0 | −22 | 13.75 | −42 | −60 | SPH | −1.4922 | 57.5 |
| 4 | 0 | −15 | 20 | 6.2 | −850 | SPH | 1.4922 | 57.5 |
| 5 | 0 | 15.5 | 27.5 | 60 | −100 | SPH | 1 | |
| I | 0 | 20 | 26 | 55 | | | | |
| 4' | 0 | −22 | 17.5 | −25 | −650 | SPH | 1.4922 | 57.5 |
| 5' | 0 | 10 | 24.5 | 26 | −60 | SPH | −1.4922 | 57.5 |
| 6' | 0 | −22 | 17.5 | −25 | −650 | SPH | 1.4922 | 57.5 |
| 7' | 0 | −15 | 29.25 | −70 | −45 | SPH | 1 | |

Although each surface is formed as a spherical surface in this embodiment, each surface may be formed as a non-rotationally symmetric surface as in Embodiment 4.

In this embodiment, the exit pupil has an oval shape, a short axis thereof in the vertical direction has a length of 9.6 mm, and a long axis thereof in the horizontal direction has a length of 12 mm. The display area where the original image is displayed in the first display element 44 has a diagonal size of about 0.84 inches (19 mm×19.8 mm), and the display area in the second display element 45 has a diagonal size of about 0.59 inches (14.7 mm×2.7 mm). The optical system in this embodiment is a displaying optical system that displays the enlarged combined image 43 at an infinitely far position in a positive direction on the z-axis with a horizontal view angle of 50 degrees and a vertical view angle of 40 degrees.

In this his embodiment, the vertical view angle is divided into the 29-degree view angle and the 9-degree view angle to be displayed by the two display elements 44 and 45, and on the other hand, the 50-degree horizontal view angle is displayed by each of the display elements 44 and 45 because the horizontal view angle is not divided.

Embodiment 6

Figure 17:
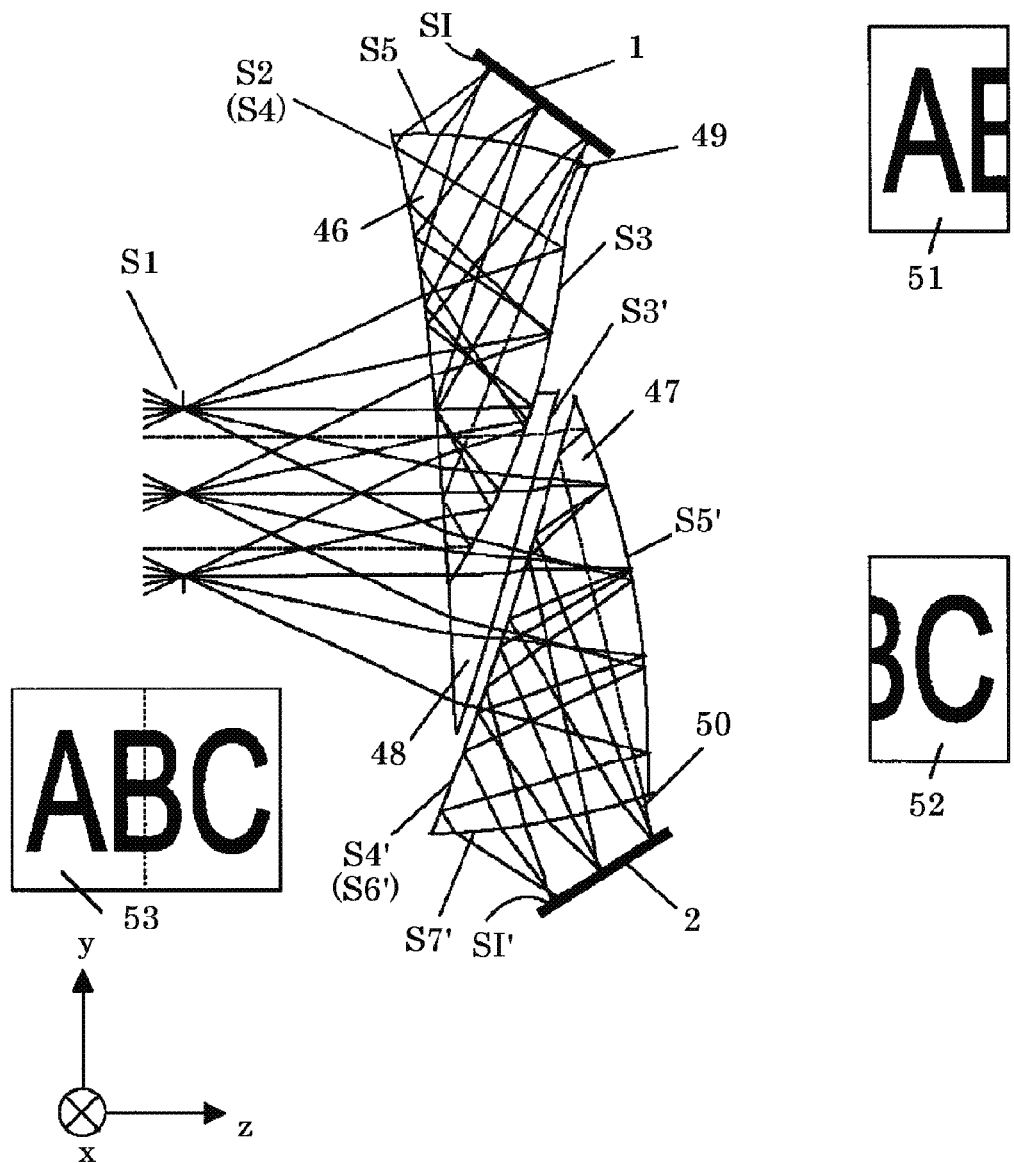
FIG. 17 is a diagrammatic illustration showing an HMD that is Embodiment 6 of the present invention.

FIG. 17 shows an HMD (image display apparatus) that is a sixth embodiment (Embodiment 6) of the present invention. The HMD of this embodiment introduces light fluxes from two display elements provided for two view angles divided in a horizontal direction that is a decentering cross-sectional direction of an optical system to an exit pupil of the optical system.

Reference numerals 46, 47 and 48 respectively denote a first optical element, a second optical element and a third optical element, each being formed as a prism. The first optical element 46 has three surfaces S2(S4), S3 and S5. The second optical element 47 has three surfaces S4'(S6'), S5' and S7'. The third optical element 48 has three surfaces including a surface S3 cemented to the first optical element 46, a surface (S2) continuous to the surface S2 of the first optical element 46 and a surface S3'. The surface S2 and the surface S4 are formed as a same surface, and the surface S4' and the surface S6' are formed as a same surface. Reference numerals 1 and 2 respectively denote a first display element and a second display element. A surface SI and a surface SI' are display surfaces of the first and second display elements 1 and 2, respectively. Reference character S1 denotes an exit pupil.

A first light flux 49 that has emerged from a first original image 51 displayed on the first display element 1 enters the first optical element 46 through the surface S5, is reflected by the surface S4 and the surface S3, and then exits the first optical element 46 through the surface S2 to be introduced to an eye (exit pupil S1). A second light flux 50 that has emerged from a second original image 52 displayed on the second display element 2 enters the second optical element 47 through the surface S7', is reflected at the surface S6' and the surface S5', and then exits the second optical element 47 through the surface S4'.

Thereafter, the second light flux 50 passes through an air layer between the surface S4' and the surface S3', and then enters the third optical element 48 through the surface S3'. A part of the second light flux 50 that has entered the third optical element 48 enters the first optical element 46 through the surface S3, and then exits the first optical element 46 through the surface S2 to be introduced to the eye (exit pupil S1). Another part of the second light flux 50 that has entered the third optical element 48 exits the third optical element 48 through the surface S2 to be introduced to the eye (exit pupil S1) without entering the first optical element 46.

It is desirable that the reflection at the surface S4 of the first optical element 46 and the reflection at the surface S6' of the second optical element 47 be internal total reflection in each prism. Such internal total reflection reduces a light amount loss to enable present a bright enlarged combined image 53.

Figure 18:
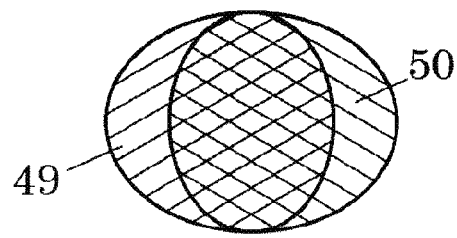
FIG. 18 is a figure for explaining overlapping of light fluxes on an exit pupil plane in Embodiment 6.

Of the first light flux 49 from the first display element 1 and the second light flux 50 from the second display element 2, partial light fluxes (light flux components) being introduced to a same point in the enlarged combined image 53 are overlapped with each other on an exit pupil plane as shown in FIG. 18. On the exit pupil plane, the first light flux 49 forms a left area of the exit pupil, and the second light flux 50 forms a right area of the exit pupil. In addition, the first light flux 49 and the second light flux 50 are overlapped with each other in a central area of the exit pupil.

Description will hereinafter be made of a case where the optical system divides a horizontal view angle of 50 degrees into two view angles and a horizontal width (diameter) of the exit pupil is 12 mm. In this optical system, when a radius of rotation of the eye is 12 mm, a center of a pupil of the eye observing a direction of a left maximum view angle of 25 degrees is moved to the left by 5.1 mm with respect to the center of the pupil of the eye observing a direction of a view angle of 0 degree.

In this state, if the second light flux 50 is introduced to the center of the pupil of the eye, all light rays forming an entire view angle corresponding to the second display element 2 enter at least a half area of the pupil of the eye. Thereby, an optical system can be achieved from which light fluxes (light rays) forming an entire view angle constituted by the view angles corresponding to the first and second display elements 1 and 2 are introduced to the pupil of the eye.

Thus, it is only necessary that a horizontal width of the second light flux 50 be 5.1 mm on a left side and 6 mm on a right side with respect to the exit pupil diameter of 12 mm. Similarly, it is only necessary that a horizontal width of the first light flux 49 be 6 mm on the left side and 5.1 mm on the right side with respect to the exit pupil diameter of 12 mm.

In this embodiment, the area where the first light flux 49 and the second light flux 50 are overlapped with each other on the exit pupil plane in the decentering cross-section is approximately an 85-percent (b/a=0.85) area of the exit pupil. In other words, the first light flux 49 and the second light flux 50 are overlapped with each other at an overlapping ratio of approximately 85% of the exit pupil. In such a state, the light fluxes forming the entire view angle are introduced to the pupil of the eye.

Therefore, it is unnecessary to provide overlapping areas in the first and second original images 51 and 52 respectively displayed on the first and second display elements 1 and 2. In other words, in a case where the enlarged combined image 53 being observed is formed such that edges of the first and second original images 51 and 52 are jointed to each other as shown in FIG. 17, it is unnecessary to provide the overlapping areas in the first and second original images 51 and 52 as shown in the figure.

Providing no overlapping area in the first and second original images 51 and 52 makes it possible to efficiently use a display area of each display element, which increases image information presentation efficiency of each display element.

Further, although the overlapping of the light fluxes at the same image point is necessary for observation of a continuous (seamless) enlarged combined image when the eye is rotated, the reduced overlapping ratio described above makes it possible to decrease the thickness of the optical system.

In this embodiment, the surface S3 of the first optical element 46 is constituted by a half-mirror surface and further the surface S2 of the third optical element 48 has a transmittance of 50% to introduce the first and second light fluxes 49 and 50 from the first and second display elements 1 and 2 with a same luminance to the exit pupil. However, the area of the exit pupil plane where the first and second light fluxes 49 and 50 are overlapped with each other has a higher luminance than those of other areas, and therefore it is desirable to provide a light amount reducing element on an optical path or to reduce a luminance of the overlapping areas of the two original images, as described in Embodiment 4.

Table 3 shows optical data of this embodiment when the surfaces S2 to S5 and the surfaces S3' to S7' are non-rotationally symmetric surfaces whose unique symmetry plane is a paper (y-z cross-section) of FIG. 17.

TABLE 3

| SURF | X | Y | Z | A | Rx | Ry | TYP | Nd | vd |
|---|---|---|---|---|---|---|---|---|---|
| 1 | 0 | 0 | 0 | 0 | | | | | |
| 2 | 0 | −29.28 | 19.944 | 1.005 | −797.8534 | −797.8534 | FFS1-1 | 1.5709 | 33.8 |
| 3 | 0 | −20.73 | 6.808 | −49.66 | −54.4632 | −67.6612 | FFS2-2 | −1.5709 | 33.8 |
| 4 | 0 | −29.28 | 19.944 | 1.005 | −797.8534 | −797.8534 | FFS1-1 | 1.5709 | 33.8 |
| 5 | 0 | 22.599 | 30.903 | 62.518 | −19.8002 | −25.6133 | FFS2-3 | 1 | |
| I | 0 | 25.815 | 28.697 | 53.192 | | | | | |
| 3' | 0 | −37.21 | 9.799 | −33.78 | −79.0394 | −66.936 | FFS2-4 | 1 | |
| 4' | 0 | −17.82 | 20.448 | −19.82 | −461.4041 | −461.4041 | FFS1-5 | 1.5709 | 33.8 |
| 5' | 0 | 5.658 | 28.708 | 23.08 | −61.4011 | −65.9939 | FFS2-6 | −1.5709 | 33.8 |
| 6' | 0 | −17.82 | 20.448 | −19.82 | −461.4041 | −461.4041 | FFS1-5 | 1.5709 | 33.8 |
| 7' | 0 | −22.97 | 29.551 | −74.22 | −27.8292 | −55.5115 | FFS2-7 | 1 | |
| I' | 0 | −28.22 | 28.347 | −57.27 | | | | | |

| FFS1-1 | $c_1$ | 1.77E+02 | $c_5$ | −3.77E−05 | $c_6$ | −1.84E−04 | $c_{10}$ | 4.26E−08 |
|---|---|---|---|---|---|---|---|---|
| | $c_{11}$ | −4.34E−06 | $c_{12}$ | 6.17E−08 | $c_{13}$ | −2.91E−09 | $c_{14}$ | −6.97E−09 |
| | $c_{20}$ | −9.56E−11 | $c_{21}$ | −1.31E−11 | $c_{22}$ | 7.44E−10 | $c_{23}$ | −7.94E−12 |
| | $c_{24}$ | −3.56E−13 | $c_{25}$ | 1.27E−12 | $c_{26}$ | −1.25E−12 | | |

TABLE 3-continued

| | | | | | | | |
|---|---|---|---|---|---|---|---|
| FFS2-2 | cx1 | −6.77E+01 | cy1 | −5.45E+01 | c5 | −3.96E−01 | c6 | 5.20E−02 |
| | c10 | −2.12E−04 | c11 | −2.67E−04 | c12 | −4.77E−06 | c13 | −3.48E−06 |
| | c14 | 5.16E−08 | c20 | 3.22E−08 | c21 | −2.68E−09 | c22 | −8.20E−11 |
| | c23 | 4.11E−10 | c24 | 8.14E−10 | c25 | −1.12E−11 | c26 | −6.70E−12 |
| FFS2-3 | cx1 | −3.07E+00 | cy1 | −5.60E+00 | c5 | −2.81E−03 | c6 | −3.58E−03 |
| | c10 | 5.76E−05 | c11 | 1.11E−04 | c12 | 8.96E−06 | c13 | 1.52E−06 |
| | c14 | 9.61E−07 | c20 | 3.38E−08 | c21 | 4.57E−08 | c22 | −1.59E−08 |
| | c23 | 1.34E−08 | c24 | 5.51E−09 | c25 | 7.59E−09 | c26 | 1.33E−09 |
| FFS2-4 | cx1 | −7.85E+00 | cy1 | −7.62E−01 | c5 | 1.85E−03 | c6 | 1.46E−03 |
| | c10 | 1.35E−05 | c11 | 2.02E−05 | c12 | −1.92E−08 | c13 | 8.78E−08 |
| | c14 | 7.69E−08 | c20 | 7.00E−10 | c21 | 2.19E−09 | c22 | 4.14E−09 |
| | c23 | −2.14E−10 | c24 | 3.45E−11 | c25 | 2.71E−11 | c26 | 6.81E−12 |
| FFS1-5 | c1 | 3.02E+01 | c5 | 3.41E−04 | c6 | −2.34E−04 | c10 | 2.80E−07 |
| | c11 | −6.22E−06 | c12 | 2.33E−07 | c13 | −2.57E−08 | c14 | 1.02E−09 |
| | c20 | 8.60E−11 | c21 | −7.71E−10 | c22 | 3.63E−09 | c23 | 6.37E−11 |
| | c24 | 9.44E−12 | c25 | −2.03E−12 | c26 | −1.72E−12 | | |
| FFS2-6 | cx1 | −2.06E+00 | cy1 | 2.80E−01 | c5 | 1.64E−04 | c6 | −3.19E−04 |
| | c10 | 5.52E−06 | c11 | −7.54E−07 | c12 | 5.85E−08 | c13 | 2.87E−08 |
| | c14 | −2.51E−08 | c20 | −6.20E−10 | c21 | 7.33E−10 | c22 | −3.27E−11 |
| | c23 | 1.86E−10 | c24 | 4.53E−12 | c25 | −4.07E−11 | c26 | 3.09E−11 |
| FFS2-7 | cx1 | −2.72E+00 | cy1 | −4.12E+01 | c5 | −3.86E−03 | c6 | −2.83E−03 |
| | c10 | 1.50E−05 | c11 | −3.31E−04 | c12 | 5.53E−06 | c13 | 8.77E−07 |
| | c14 | −1.65E−06 | c20 | 4.31E−08 | c21 | 1.12E−07 | c22 | −5.53E−07 |
| | c23 | 2.86E−08 | c24 | −1.71E−09 | c25 | 5.60E−09 | c26 | 3.93E−09 |

In this embodiment, the exit pupil has an oval shape, a short axis thereof in the vertical direction has a length of 9.6 mm, and a long axis thereof in the horizontal direction has a length of 12 mm. The display area where the original image is displayed in each of the first and second display elements 1 and 2 has a diagonal size of about 0.59 inches (12 mm×9 mm). The optical system in this embodiment is a displaying optical system that displays an enlarged combined image 53 at an infinitely far position in a positive direction on the z-axis with the horizontal view angle of 50 degrees and a vertical view angle of 38 degrees.

In this embodiment, two 25-degree horizontal view angles of the entire horizontal view angle are respectively displayed by the two display elements 1 and 2, and on the other hand, the 38-degree vertical view angle is displayed by each of the display elements 1 and 2 because the vertical view angle is not divided.

Embodiment 7

Figure 19:
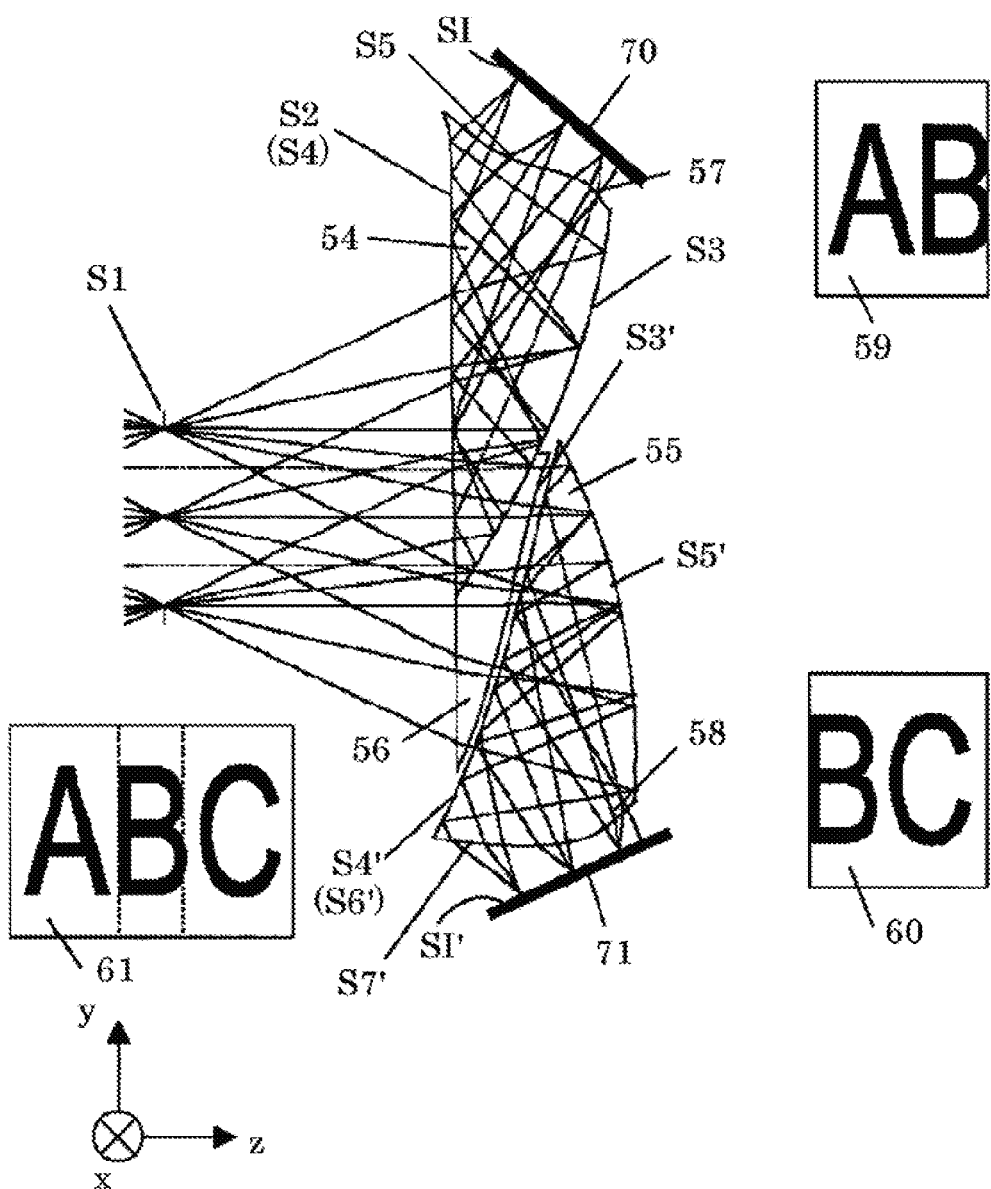
FIG. 19 is a diagrammatic illustration showing an HMD that is Embodiment 7 of the present invention.

FIG. 19 shows an HMD (image display apparatus) that is a seventh embodiment (Embodiment 7) of the present invention. The HMD of this embodiment, as in Embodiment 6, introduces light fluxes from two display elements provided for two view angles divided in the horizontal direction that is the direction of the decentering cross-section of its optical system to an exit pupil thereof. However, in this embodiment, original images displayed on the two display elements have overlapping areas where a same image is displayed.

Reference numerals 54, 55 and 56 respectively denote a first optical element, a second optical element and a third optical element, each being formed as a prism. The first optical element 54 has three surfaces S2(S4), S3 and S5. The second optical element 55 has three surfaces S4'(S6'), S5' and S7'. The third optical element 56 has three surfaces including a surface S3 cemented to the first optical element 54, a surface (S2) continuous to the surface S2 of the first optical element 54 and a surface S3'. The surface S2 and the surface S4 are formed as a same surface, and the surface S4' and the surface S6' are formed as a same surface. Reference numerals 70 and 71 respectively denote a first display element and a second display element. A surface SI and a surface SI' are display surfaces of the first and the second display elements 70 and 71, respectively. Reference character S1 denotes an exit pupil. Optical paths and optical actions are the same as those of Embodiment 6.

Also in this embodiment, it is desirable that the reflection at the surface S4 of the first optical element 54 and the reflection at the surface S6' of the second optical element 55 be internal total reflection in each prism. Such internal total reflection reduces a light amount loss to enable present a bright enlarged combined image 61.

Figure 20:
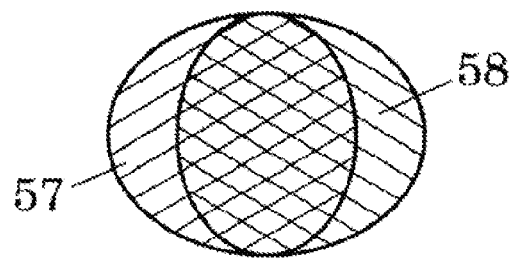
FIG. 20 is a figure for explaining overlapping of light fluxes on an exit pupil plane in Embodiment 7.

Of a first light flux 57 from the first display element 70 and a second light flux 58 from the second display element 71, partial light fluxes (light flux components) being introduced to a same point in the enlarged combined image 61 are overlapped with each other on an exit pupil plane as shown in FIG. 20. On the exit pupil plane, the first light flux 57 forms a left area of the exit pupil, and the second light flux 58 forms a right area of the exit pupil. In addition, the first light flux 57 and the second light flux 58 are overlapped with each other in a central area of the exit pupil.

Description will hereinafter be made of a case where the optical system divides a horizontal view angle of 50 degrees into two view angles, and first and second original images 59 and 60 which are displayed on the first and second display elements 70 and 71 include the overlapping areas corresponding to a view angle of 6 degrees. A horizontal width (diameter) of the exit pupil is 12 mm.

In this optical system, when a radius of rotation of an eye is 12 mm, a center of a pupil of the eye observing a direction of a left maximum view angle of 25 degrees is moved to the left by 5.1 mm with respect to the center of the pupil of the eye observing a direction of a view angle of 0 degree. In this state, if the second light flux 58 is introduced to the center of the pupil of the eye, all light rays forming an entire view angle corresponding to the second display element 71 enter at least a half area of the pupil of the eye. Thereby, an optical system can be achieved from which light fluxes (light rays) forming an entire view angle constituted by the view angles corresponding to the first and second display elements 70 and 71 are introduced to the pupil of the eye.

Thus, it is only necessary that a horizontal width of the second light flux 58 be 5.1 mm on a left side and 6 mm on a right side with respect to the exit pupil diameter of 12 mm. Similarly, it is only necessary that a horizontal width of the first light flux 57 be 6 mm on the left side and 5.1 mm on the right side with respect to the exit pupil diameter of 12 mm.

However, in this embodiment, the original images include the overlapping areas. Thus, to the center of the pupil of the eye observing the direction of the left maximum view angle, a light flux from the 0-degree view angle to a right 6-degree view angle in the overlapping area of the first original image 59 displayed on the first display element 70 is introduced. Therefore, if a light flux from the right 6-degree view angle to a right 25-degree view angle in the overlapping area of the second original image 60 displayed on the second display element 71 is introduced to the center of the pupil of the eye, an optical system can be achieved from which the light fluxes forming the entire view angle are introduced to the pupil of the eye.

In this case, it is only necessary that a horizontal width of the second light flux 58 be 3.3 mm on a left side and 6 mm on a right side with respect to the exit pupil diameter of 12 mm. Similarly, it is only necessary that a horizontal width of the first light flux 57 be 6 mm on the left side and 3.3 mm on the right side with respect to the exit pupil diameter of 12 mm.

Figure 21A:
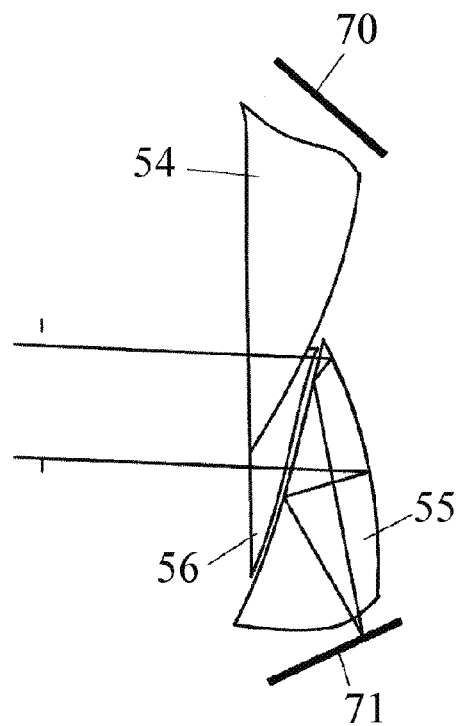
FIG. 21A to 21C are figures for explaining solution of the conventional problem in Embodiment 7.
Figure 21B:
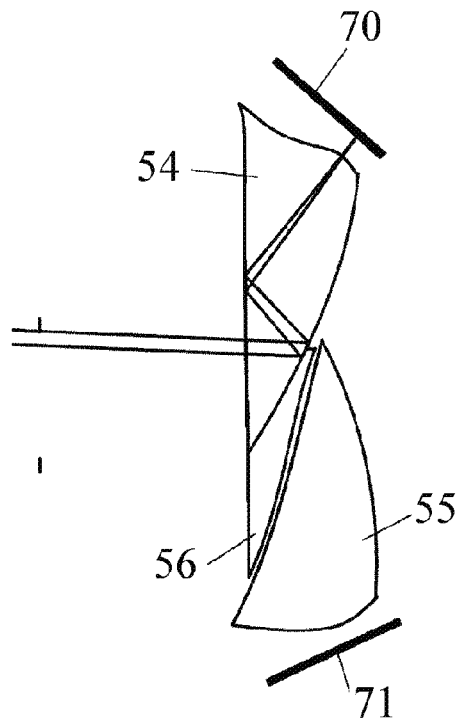
Figure 21C:
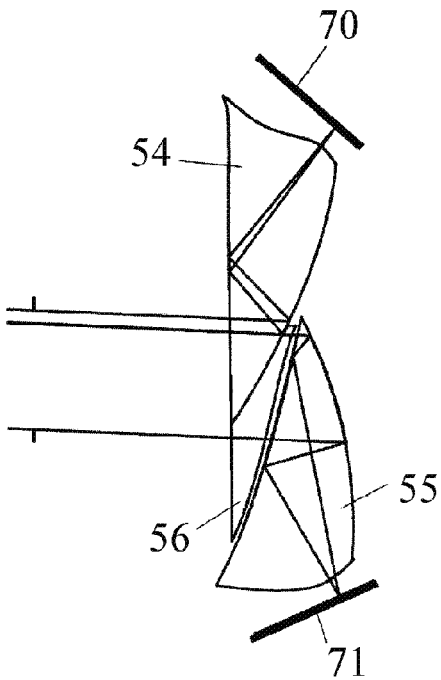

As described above, in this embodiment, the overlapping areas are provided in the first and second original images 59 and 60 respectively displayed on the first and second display elements 70 and 71. Therefore, setting an overlapping ratio of the first and second light fluxes 57 and 58 on the exit pupil plane in the decentering cross-section of the optical system to about 55% of the exit pupil enables achieving of an optical system from which the light fluxes of the entire view angle are introduced to the pupil of the eye. In the case where the overlapping ratio of the first and second light fluxes 57 and 58 on the exit pupil plane is about 55% of the exit pupil, when the eye is rotated leftward, a light flux forming a right shallow view angle from the second display element 71 is not introduced to a left edge of the exit pupil as shown in FIG. 21A. However, a light flux from the overlapping area in the first original image 59 displayed on the first display element 70 is introduced to the left edge of the exit pupil as shown in FIG. 21B. As a result, the light flux is introduced to the entire area of the exit pupil as shown in FIG. 21C.

Also in this embodiment, limiting effective areas of the surfaces S3 and S5' enables setting of the overlapping ratio of the first and second light fluxes 57 and 58 on the exit pupil plane to a predetermined value. However, since the two original images include the overlapping areas in this embodiment, providing a stopper as in Embodiment 4 or limiting effective areas of the surfaces S5 and S7' with a light-shielding element such as a black painted member prevents entering of the light fluxes from the overlapping areas into the first and second optical elements 54 and 55, which is not desirable.

Further, also in this embodiment, the surface S3 of the first optical element 54 is constituted by a half-mirror surface and further the surface S2 of the third optical element 56 has a transmittance of 50% to introduce the first and second light fluxes 57 and 58 from the first and second display elements 70 and 71 with a same luminance to the exit pupil. However, the area of the exit pupil plane where the first and second light fluxes 57 and 58 are overlapped with each other has a higher luminance than those of other areas, and therefore it is desirable to provide a light amount reducing element on an optical path or to reduce a luminance of the overlapping areas of the two original images, as described in Embodiment 4.

In this embodiment, the enlarged combined image 61 being observed is formed such that the first original image 59 and the second original image 60 are overlapped with each other in the respective overlapping areas (areas where "B" is displayed in the figure). Since the overlapping areas are provided in the two original images 59 and 60 in this embodiment, image information presentation efficiency of each display element is slightly lower than that in Embodiment 6. However, the overlapping ratio of the light fluxes being introduced to the same image point becomes smaller than a case where no overlapping area is provided, the overlapping being necessary for observation of a continuous (seamless) enlarged combined image when the eye is rotated. This enables reduction in thickness of the optical system.

Moreover, in this embodiment, providing the overlapping areas in the original images enables adjustment of a gap at a boundary part of enlarged images that are combined, by changing the size of the overlapping areas, the gap being caused due to a manufacturing error of the prism or a positional displacement between the display element and the prism. Therefore, even though accuracy required for the optical system is lower than the case where no overlapping area is provided, this embodiment can present a continuous enlarged combined image in which a joint line in the boundary part of the enlarged images corresponding to the respective original images is not noticeable.

Although this embodiment described the case where the overlapping area has a size corresponding to the view angle of 6 degrees, the size of the overlapping area is not limited thereto. However, enlarging the overlapping area reduces the image information presentation efficiency of the display element, and this makes it difficult to achieve a wide view angle. Therefore, it is desirable that the size of the overlapping area be small, for example, a size corresponding to a view angle of 10 degrees or less.

Furthermore, an area of the enlarged combined image corresponding to the overlapping area has a luminance twice as high as those of other areas, as is the area where the first and second light fluxes 57 and 58 are overlapped with each other on the exit pupil plane. Therefore, it is desirable to provide a light amount reducing element such as a neutral density (ND) filter on an optical path on which the first and second light fluxes 57 and 58 reach the area of the enlarged combined image corresponding to the overlapping area or to reduce a luminance of the overlapping areas of the two original images.

Table 4 shows optical data of this embodiment when the surfaces S2 to S5 and the surfaces S3' to S7' are non-rotationally symmetric surfaces whose unique symmetry plane is a paper (y-z cross-section) of FIG. 19.

TABLE 4

| SURF | X | Y | Z | A | Rx | Ry | TYP | Nd | vd |
| --- | --- | --- | --- | --- | --- | --- | --- | --- | --- |
| 1 | 0 | 0 | 0 | 0 | | | | | |
| 2 | 0 | −15.71 | 20 | −0.067 | −876.1563 | −876.1563 | FFS1-1 | 1.5709 | 33.8 |
| 3 | 0 | −23.75 | 2.968 | −53.17 | −44.8425 | −58.3308 | FFS2-2 | −1.5709 | 33.8 |
| 4 | 0 | −15.71 | 20 | −0.067 | −876.1563 | −876.1563 | FFS1-1 | 1.5709 | 33.8 |

TABLE 4-continued

| | | | | | | | | | |
|---|---|---|---|---|---|---|---|---|---|
| 5 | 0 | 22.739 | 28.721 | 57.193 | −8.7152 | −3.0933 | FFS2-3 | 1 | |
| I | 0 | 24.38 | 30.399 | 48.538 | | | | | |
| 3' | 0 | −24.97 | 14.225 | −54.88 | −71.1719 | −17.2091 | FFS2-4 | 1 | |
| 4' | 0 | −19.19 | 19.726 | −25.03 | −63.7117 | −63.7117 | FFS1-5 | 1.5709 | 33.8 |
| 5' | 0 | 8.181 | 25.267 | 32.245 | −49.7102 | −59.5281 | FFS2-6 | −1.5709 | 33.8 |
| 6' | 0 | −19.19 | 19.726 | −25.03 | −63.7117 | −63.7117 | FFS1-5 | 1.5709 | 33.8 |
| 7' | 0 | −21.62 | 29.13 | −65.86 | −21.2751 | −7.0811 | FFS2-7 | 1 | |
| I' | 0 | −24.65 | 26.815 | −65.81 | | | | | |

| | | | | | | | | | |
|---|---|---|---|---|---|---|---|---|---|
| FFS1-1 | c1 | 4.23E+02 | c5 | −2.76E−03 | c6 | −1.63E−03 | c10 | −2.54E−07 | |
| | c11 | −1.73E−05 | c12 | 1.72E−07 | c13 | −4.66E−08 | c14 | −2.77E−08 | |
| | c20 | −3.55E−10 | c21 | −5.18E−10 | c22 | 5.88E−09 | c23 | −2.11E−10 | |
| | c24 | −1.01E−12 | c25 | 8.26E−12 | c26 | −7.84E−12 | | | |
| FFS2-2 | cx1 | −5.83E+01 | cy1 | −4.48E+01 | c5 | −2.04E−01 | c6 | 6.21E−02 | |
| | c10 | −4.77E−04 | c11 | 1.04E−04 | c12 | 2.32E−06 | c13 | −1.50E−05 | |
| | c14 | 1.96E−07 | c20 | −4.74E−08 | c21 | 2.32E−08 | c22 | 7.52E−11 | |
| | c23 | −2.43E−10 | c24 | 1.11E−09 | c25 | 2.63E−11 | c26 | 6.64E−13 | |
| FFS2-3 | cx1 | −1.26E+01 | cy1 | −5.91E+00 | c5 | −3.68E−03 | c6 | −2.35E−03 | |
| | c10 | 7.55E−04 | c11 | −6.30E−04 | c12 | 2.30E−05 | c13 | −2.38E−05 | |
| | c14 | −1.90E−06 | c20 | 7.92E−08 | c21 | −7.79E−07 | c22 | 1.58E−06 | |
| | c23 | 5.45E−08 | c24 | −4.52E−08 | c25 | 7.90E−08 | c26 | −1.26E−08 | |
| FFS2-4 | cx1 | −1.11E+02 | cy1 | −6.51E+00 | c5 | 6.20E−03 | c6 | −2.68E−03 | |
| | c10 | −6.64E−05 | c11 | −2.70E−05 | c12 | 1.70E−07 | c13 | −6.61E−08 | |
| | c14 | −4.24E−07 | c20 | 4.21E−10 | c21 | −2.16E−08 | c22 | 1.71E−09 | |
| | c23 | 7.38E−10 | c24 | 8.74E−10 | c25 | −8.46E−11 | c26 | 9.89E−11 | |
| FFS1-5 | c1 | −4.27E+01 | c5 | 6.73E−04 | c6 | −1.02E−03 | c10 | −4.46E−06 | |
| | c11 | −5.93E−05 | c12 | 4.62E−07 | c13 | 7.68E−09 | c14 | −8.76E−08 | |
| | c20 | −8.34E−10 | c21 | 8.63E−10 | c22 | −1.88E−08 | c23 | −4.63E−10 | |
| | c24 | −4.86E−11 | c25 | −6.10E−11 | c26 | 2.01E−12 | | | |
| FFS2-6 | cx1 | −1.24E+00 | cy1 | −3.40E−01 | c5 | −7.13E−04 | c6 | −1.39E−03 | |
| | c10 | 5.41E−06 | c11 | −1.16E−05 | c12 | 1.78E−07 | c13 | 2.58E−08 | |
| | c14 | −2.19E−07 | c20 | 2.19E−09 | c21 | 1.66E−09 | c22 | −1.04E−08 | |
| | c23 | 1.56E−10 | c24 | −4.96E−11 | c25 | −1.60E−11 | c26 | 2.99E−11 | |
| FFS2-7 | cx1 | −9.48E+00 | cy1 | −1.16E+01 | c5 | 1.66E−02 | c6 | −8.05E−04 | |
| | c10 | 1.57E−04 | c11 | 1.43E−04 | c12 | −2.12E−05 | c13 | −1.97E−05 | |
| | c14 | −7.86E−06 | c20 | −1.22E−07 | c21 | −2.97E−07 | c22 | −1.68E−06 | |
| | c23 | 5.02E−08 | c24 | 4.48E−09 | c25 | 3.93E−09 | c26 | 9.93E−09 | |

In this embodiment, the exit pupil has an oval shape, a short axis thereof in the vertical direction has a length of 9.6 mm, and a long axis thereof in the horizontal direction has a length of 12 mm. The display area where the original image is displayed in each of the first and second display elements 70 and 71 has a diagonal size of about 0.59 inches (12 mm×9 mm). The optical system in this embodiment is a displaying optical system that displays an enlarged combined image 61 at an infinitely far position in a positive direction on the z-axis with the horizontal view angle of 50 degrees and a vertical view angle of 38 degrees.

In this embodiment, two 31-degree horizontal view angles each including a 25-degree view angle corresponding to half of the entire horizontal view angle of 50 degrees and the view angle of 6 degrees corresponding to the overlapping area are respectively displayed by the two display elements 70 and 71. On the other hand, the 38-degree vertical view angle is displayed by each of the display elements 70 and 71 because the vertical view angle is not divided.

As described above, each embodiment can achieve a small and thin HMD capable of presenting the enlarged combined image with a wide view angle and suppressing generation of image lacking even when the observer's eye is rotated. In other words, each embodiment allows overlapping of the light flux components of the first and second light fluxes on the exit pupil plane, the light flux components being introduced to the same image point in the enlarged combined image. This makes it possible to introduce the light fluxes forming the entire view angle to the observer's eye (pupil) by eliminating or reducing the overlapping areas of the original images displayed on the display elements. Thus, in each embodiment, the image information presentation efficiency is improved, which makes it easy to realize a wide view angle.

In Embodiments 2 to 7, on the exit pupil plane, the overlapping ratio of the light flux components of the first and second light fluxes which are introduced to the same image point in the enlarged combined image is 95% or less of the exit pupil (more preferably 85% or less, and still more preferably 80% or less). This enables further reduction in thickness of the optical system as compared with a case where the overlapping ratio on the exit pupil plane is 100%. The term "the overlapping ratio on the exit pupil plane is 95% or less of the exit pupil" means, though described in Embodiment 2, that a value of b/a is 95% (0.95) or less where a represents the width of the exit pupil in the direction in which the view angle is divided, and b represents the width of the area where the light flux components are overlapped with each other.

Furthermore, the present invention is not limited to these embodiments and various variations and modifications may be made without departing from the scope of the present invention.

This application claims the benefit of Japanese Patent Application No. 2009-119593, filed on May 18, 2009, which is hereby incorporated by reference herein in its entirety.

What is claimed is:
1. An image display apparatus comprising:
  a first display element configured to display a first original image;
  a second display element configured to display a second original image; and
  an optical system configured to present to an observer an enlarged combined image of the first and second original images with a first light flux from the first display element and a second light flux from the second display element, wherein the optical system includes at least one reflective surface, wherein, when a cross-section of the optical system on which optical paths of the first light flux and the second light flux are turned by reflections at the reflective surface is defined as a decentering cross-section, the first original image and the second original image correspond to different view angles from each other in the decentering cross-section, and wherein light flux components which are respectively included in the first light flux and the second light flux and introduced to a same image point in the enlarged combined image are overlapped with each other on an exit pupil plane of the optical system.

2. An image display apparatus according to claim 1,
wherein the reflective surface is a decentered reflective curved surface, and
wherein a local meridional cross-section of the decentered reflective curved surface coincides with the decentering cross-section.

3. An image display apparatus according to claim 1,
wherein the first original image and the second original image do not include a same original image part.

4. An image display apparatus according to claim 1,
wherein the light flux components being introduced to the same image point are overlapped with each other at an overlapping ratio of 95% or less of the exit pupil of the optical system.

* * * * *